(12) United States Patent
Guse et al.

(10) Patent No.: US 11,511,671 B2
(45) Date of Patent: Nov. 29, 2022

(54) COMPACT, STOWABLE STAIRCASE FOR VEHICLE

(71) Applicant: Lifeline Mobile, Inc., Columbus, OH (US)

(72) Inventors: Kenneth L. Guse, Pickerington, OH (US); Daniel Atchley, Columbus, OH (US)

(73) Assignee: Lifeline Mobile, Inc., Columbus, OH (US)

( * ) Notice: Subject to any disclaimer, the term of this patent is extended or adjusted under 35 U.S.C. 154(b) by 204 days.

(21) Appl. No.: 17/061,635

(22) Filed: Oct. 2, 2020

(65) Prior Publication Data
US 2022/0105871 A1 Apr. 7, 2022

(51) Int. Cl.
*B60R 3/02* (2006.01)
*B60P 3/14* (2006.01)

(52) U.S. Cl.
CPC . *B60R 3/02* (2013.01); *B60P 3/14* (2013.01)

(58) Field of Classification Search
CPC .................................. B60R 3/02; B60P 3/14
See application file for complete search history.

(56) References Cited

U.S. PATENT DOCUMENTS

| | | | |
|---|---|---|---|
| 1,148,356 A | 7/1915 | Chickering | |
| 4,014,486 A | 3/1977 | Nelson et al. | |
| 5,025,985 A * | 6/1991 | Enander | B60H 1/00364 237/12.3 B |
| 5,154,125 A | 10/1992 | Renner et al. | |
| 5,205,603 A | 4/1993 | Burdette, Jr. | |
| 5,505,476 A * | 4/1996 | Maccabee | B60R 3/02 280/166 |
| 5,802,773 A | 9/1998 | Pingel | |
| 5,941,342 A | 8/1999 | Lee | |
| 8,246,063 B1 * | 8/2012 | Rowland | B60R 3/02 280/166 |
| 8,931,792 B1 | 1/2015 | Klassen | |
| 9,145,091 B2 | 9/2015 | Ellement | |
| 9,994,141 B1 * | 6/2018 | Hanser | B60P 3/36 |
| 2019/0202364 A1 | 7/2019 | Bostwick | |

* cited by examiner

*Primary Examiner* — Bryan A Evans
(74) *Attorney, Agent, or Firm* — Standley Law Group LLP; Jeffrey S. Standley; Adam J. Smith

(57) ABSTRACT

A compact, stowable staircase for a vehicle is provided. A first portion of steps is attached to a housing and a second portion of steps in a hinged manner for rotational movement. The second portion of steps is movable between a folded position where the first portion of steps mates with the second portion of steps, and an unfolded position where the first and second portion of steps form a continuous flight of stairs. A movement device permits movement of the housing between a retracted position where the housing is located within a storage area associated with the vehicle and an extended position where the housing is extended from the storage area.

20 Claims, 29 Drawing Sheets

COMPACT, STOWABLE STAIRCASE FOR VEHICLE

CROSS-REFERENCE TO RELATED APPLICATIONS

This application makes no priority claim.

TECHNICAL FIELD

Exemplary embodiments relate generally to a stowable staircase for a vehicle, and systems and methods related to the same.

BACKGROUND AND SUMMARY OF THE INVENTION

Commercial vehicles, such as but not limited to, semi-trailers, box trucks, and mobile medical units are generally elevated a distance from a ground surface which make ingress and egress difficult. Stair cases may be used to resolve street-to-vehicle height difference issues.

In the particular case of mobile medical units, such vehicles are sometimes used to provide increased access to medical services. Such mobile medical units may provide space and equipment for conducting medical activities. Examples of such medical activities include, for example without limitation, mammograms and other imaging, medical exams, wellness checks, and blood or plasma donations. Such mobile medical units are generally provided in the form of a motor vehicle. Ingress into, or egress from, such mobile medical units can be difficult, given its typical height from the ground. This is particularly true for elderly and infirm patients, who are often those most in need of medical services. Existing staircase designs are cumbersome to use and/or take up valuable space inside the mobile medical unit. Therefore, what is needed is a compact, stowable staircase for a mobile medical unit.

A compact, stowable staircase for a vehicle, such as but not limited to a mobile medical unit, is provided. The staircase may be configured for storage within an undercarriage of the vehicle to quickly resolve street to vehicle height differences. The staircase may be configured for folding into a housing, which may be stored within a compartment below the vehicle. When needed, the housing containing the folded stairs may be extended, such as along sliders. A portion of a cover may be rotated to expose a folded set of steps. The steps may be provided in multiple portions and may be connected to said housing, and to each other, in a hinged manner to permit unfolding form a flight of stairs. The cover may form a landing for the stairs. The staircase may be stored adjacent to an entrance and/or exit to the vehicle. The staircase may be provided in multiple orientations.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
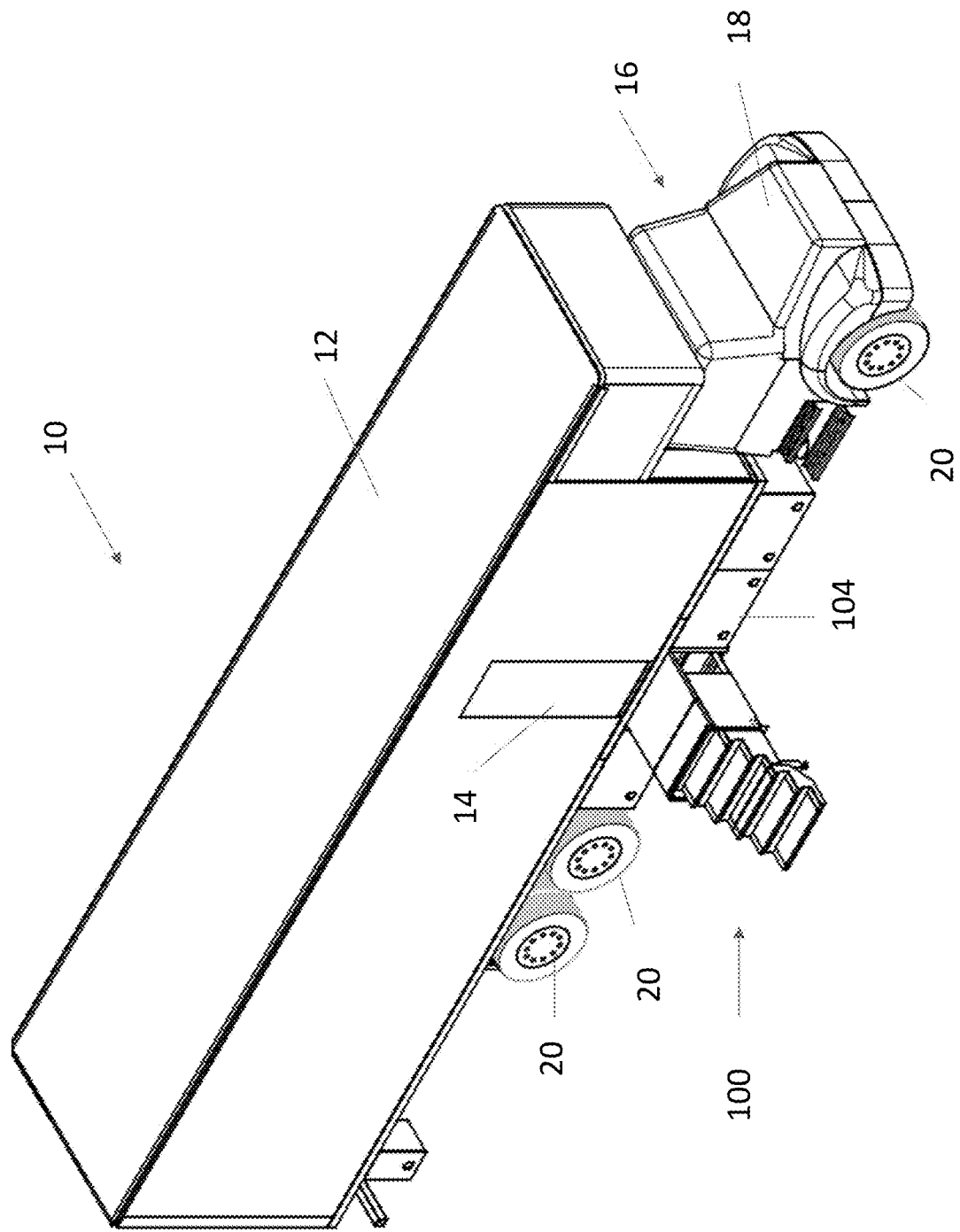
FIG. 1 is perspective view of a vehicle with a compact, stowable staircase in a deployed position in accordance with the present invention.

FIG. 1 is a perspective view of a vehicle 10. The vehicle 10 may comprise a truck, SUV, van, RV, semi-trailer truck, box truck, trailer, some combination thereof, or the like. The vehicle 10 may be configured for any purposes, and may comprise, for example without limitation, a mobile medical unit. The vehicle 10 may be configured for personal or commercial use. Any type of motor vehicle may be utilized. In exemplary embodiments, the vehicle 10 may comprise a medical compartment 12. The medical compartment 12 may comprise an examination room, medical equipment, imaging equipment, storage spaces, medications, waiting areas, passenger areas, seating, communication equipment, computers, electronic equipment, power generation equipment, displays, some combination or the like. One or more entrances 14, may be provided at the medical compartment 12 to allow passages, healthcare providers, and other persons to enter and/or exit the medical compartment 12. Any number of entrances 14 of the same or different type may be provided about any portion of the medical compartment 12, such as but not limited to, on the front, back, left, and/or right side thereof. The entrances 14 may comprise doors, doorways, passageways, combinations thereof, or the like.

The vehicle 10 may comprise a cab 16, though such is not required. The vehicle 10 may comprise one or more wheels 20 which facilitate movement of the vehicle 10. The cab 16 may accommodate a driver and any number of passengers. The cab 16 may comprise an engine compartment 18. The engine compartment 18 may comprise one or more motors or engines for powering said vehicle 10, including but not limited to, for propulsion purposes and/or for powering equipment in the medical compartment 12. The cab 16 may be provided on the same frame as the medical compartment 12. In exemplary embodiments, the cab 16 may be separate from the medical compartment 12, such as but not limited to, in a trailer arrangement.

The vehicle 10 may comprise one or more staircases 100. In exemplary embodiments, each of the staircases 100 may be configured to be selectively stowed within a storage compartment 104. The storage compartments 104, in exemplary embodiments, may be located below a portion of the medical compartment 12 and adjacent to entrances 14. Any number of staircases 100 may be utilized for some or all of the entrances 14.

Figure 2:
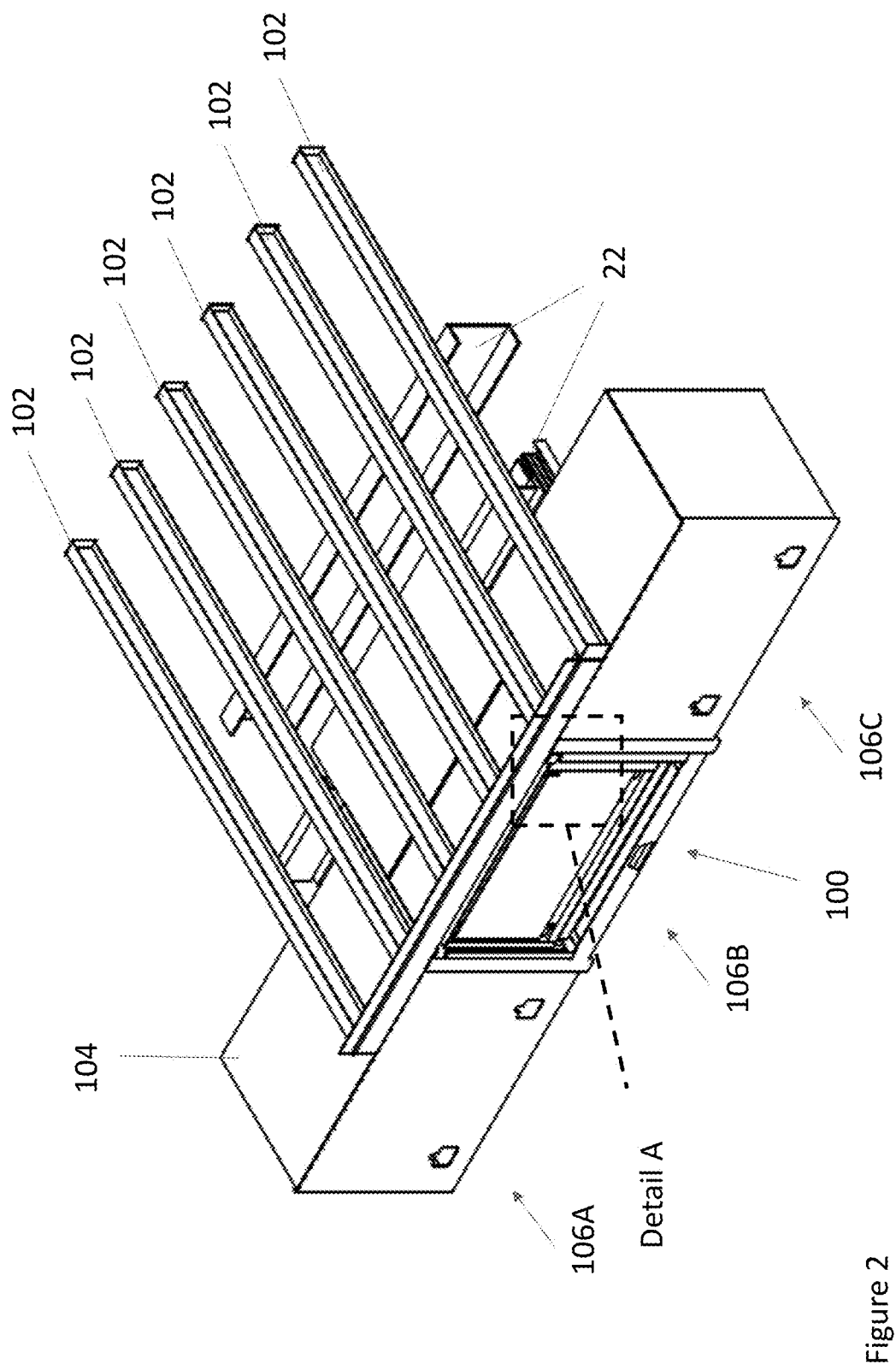
FIG. 2 is detailed perspective view of the staircase of FIG. 1 in a stowed position, the staircase being illustrated in isolation from at least certain components of the vehicle.

FIG. 2 illustrates the staircase 100 in a stowed position. One or more frame components 102 may extend from some or all of the storage compartment 104 to one or more frame members 22 of the vehicle 10. The frame components 102 may be attached to the frame members 22 and/or the storage compartment 104 by welding, adhesion, bonding, some combination thereof, or the like. The frame components 102 may form at least part of an undercarriage for the vehicle 10.

The storage compartment 104 may comprise one or more individualized storage areas 106A, B, C for the storage of equipment and components. One such individualized storage area 106B may be configured to receive the staircase 100. The storage compartment 104, in exemplary embodiments, may be configured for attachment below the medical compartment 12 of the vehicle 10 but above the ground such that sufficient clearance is provided for movement of the vehicle 10. Folding, sliding, or removable covers may be provided over some or all of the more individualized storage areas 106A, B, C, though such is not required. For example, without limitations, the particular individualized storage areas 106B may be located such that the staircase 100 is located immediately adjacent to the entrance 14 when deployed.

Figure 2B:
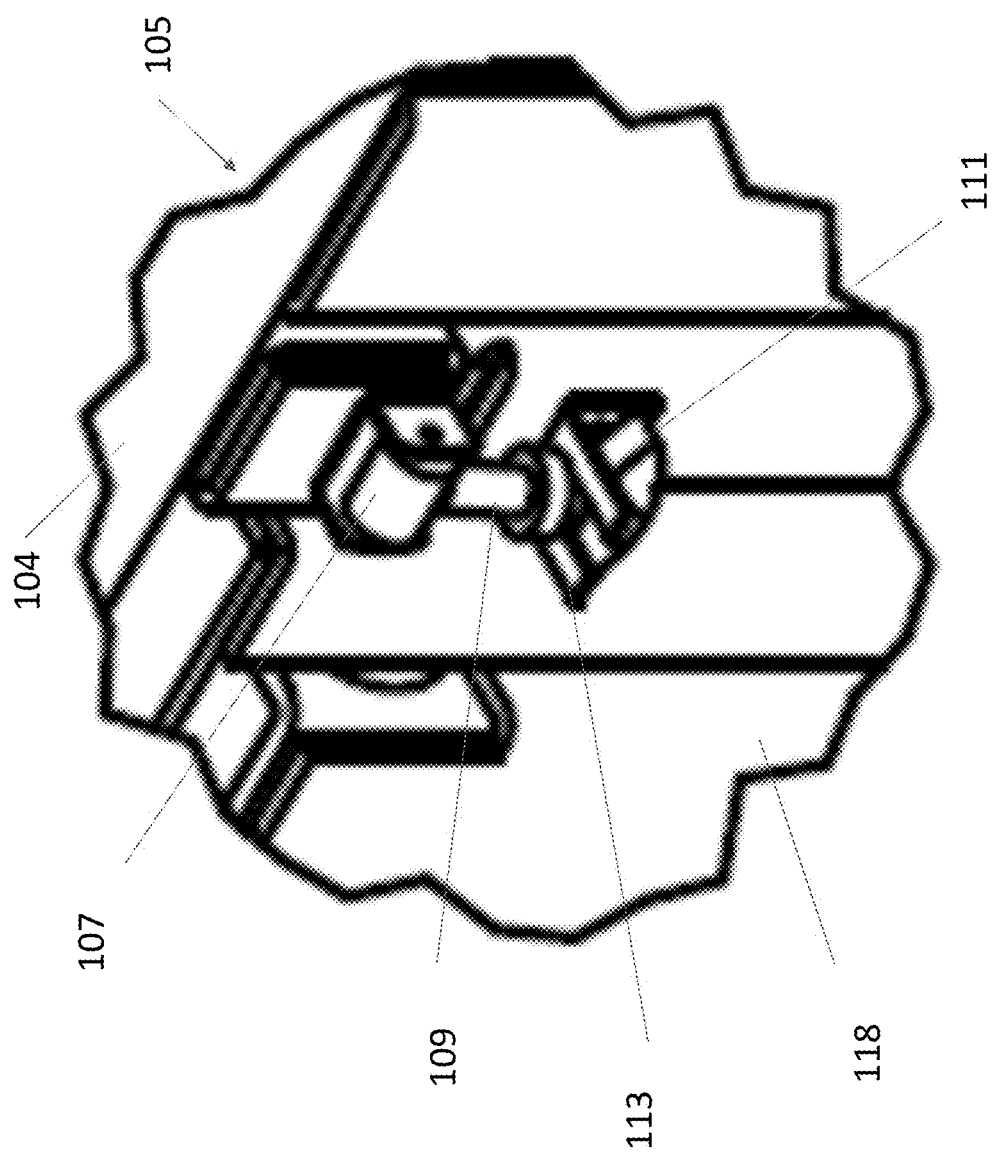
FIG. 2B is a detailed perspective view of detail A of FIG. 2 of an exemplary latching mechanism.

FIG. 2B illustrates an exemplary latching mechanism 105 for use with the staircase 100. The latching mechanism 105 may be located at one or more upper corners of the individualized storage area 106B, for example without limitation. The latching mechanism 105 may be configured to selectively secure a panel 118 or other portion of the staircase 100 to a frame or other portion of the storage compartment 104 such that the staircase 100 is selectively securable in the stored position.

Each latching mechanism 105 may comprise a hinge 107. A first portion of the hinge 107 may be connected to the storage compartment 104. A second portion of the hinge 107 may comprise, or be connected to, an extension section 109, such as but not limited to, a shaft, cord, strap, some combination thereof, or the like. An enlarged section 111 may be located on a distal end of the extension section 109. A bracket 113 may be secured to the panel 118. The bracket 113 may be configured to receive the extension section 109, such as within a slot or aperture, while preventing the enlarged section 111 from traveling past the bracket 113. Any size or shape extension section 109, enlarged section 111 and corresponding bracket 113 may be utilized. The latching mechanism 105 shown and described is merely exemplary and is not intended to be limiting. Other latching mechanism 105 may be utilized. Any number, type, and/or location of latching mechanisms 105 may be utilized.

Figure 3:
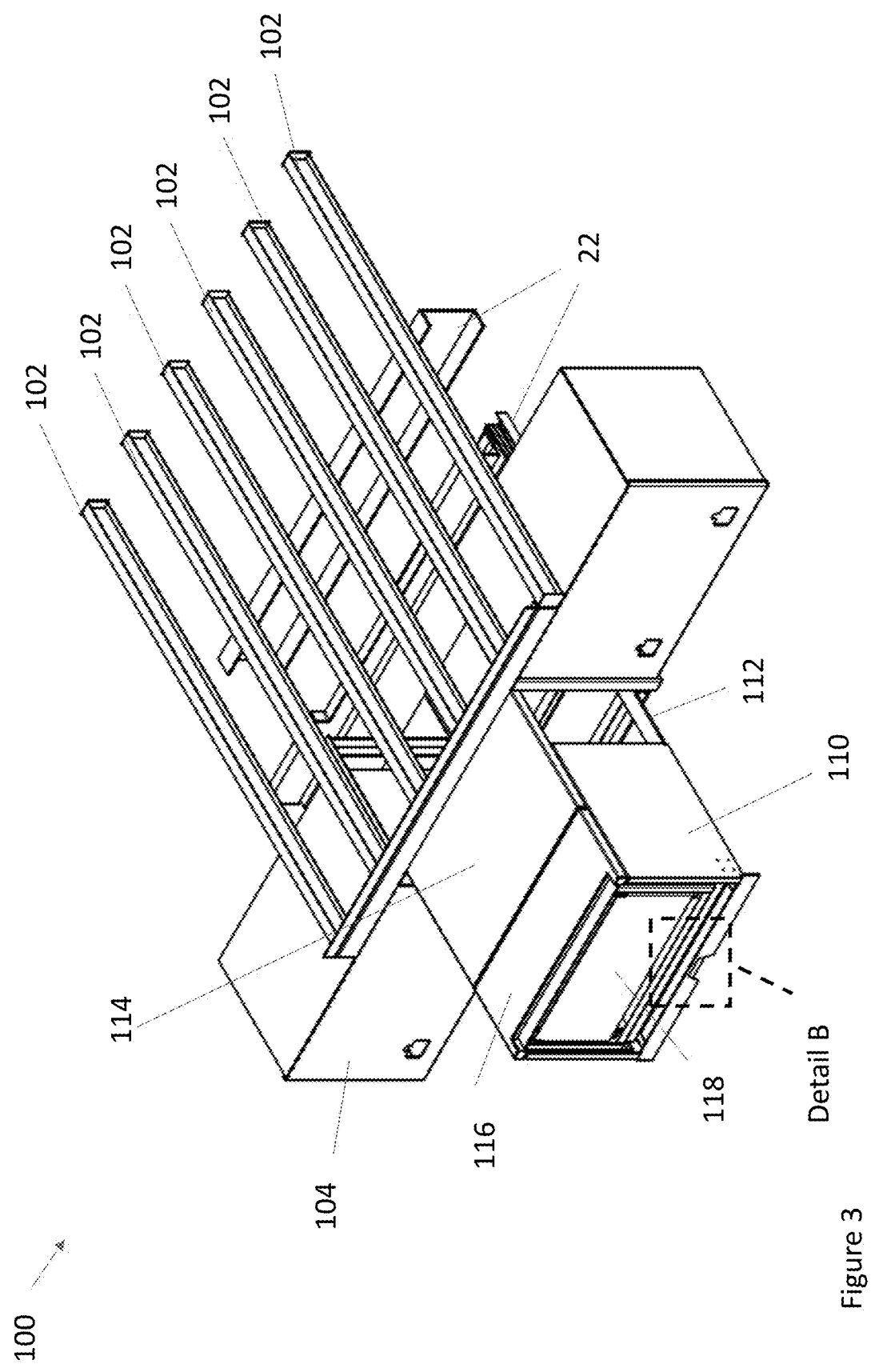
FIG. 3 is a detailed perspective view of the staircase of FIG. 2 in a partially deployed position.

FIG. 3 through FIG. 8 illustrates the staircase 100 in various stages of movement between a stored position and a deployed position. When in the stored position, a front surface of the staircase 100 may be flush or substantially flush with a front surface of the storage compartment 104. As illustrated in FIG. 3, a housing 110 may be extended from the particular individualized storage areas 106B of the storage compartment 104. In exemplary embodiments, the housing 110 may be extended along one or more rails 112 in a sliding fashion. The rails 112 may comprise drawer slides, for example without limitation. The housing 110 may comprise one or more panels defining a cuboid shape, though any shape may be utilized.

Figure 3B:
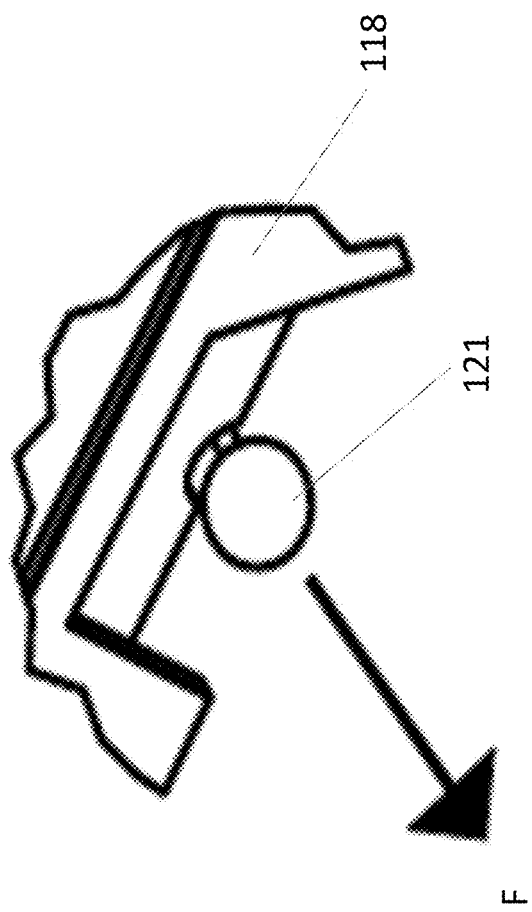
FIG. 3B is a detailed perspective view of detail B of FIG. 3 of an exemplary pull release mechanism.

FIG. 3B illustrates an exemplary pull mechanism 121. The pull mechanism 121 may comprise a handle, tab, or other component configured to facilitate movement of the staircase 100 between the stored position and extended position, such as by application of force F by a user. The pull mechanism 121 may be located at a middle portion, such as the center, of a bottom edge of the panel 118, though any number of pull mechanisms 121 at any number of locations may be utilized. The pull mechanisms 121 may come in any size and/or shape.

In exemplary embodiments, the pull mechanism 121 may be mechanically connected to pins which selectively engage the rails 112, housing 110, or other component of the staircase 100 so as to temporarily lock the staircase 100 in the extended and/or stored positions. The pull mechanism 121 may be pulled or otherwise actuated to unlock the staircase 100 for movement between such positions.

A cover 114 may form a portion of said housing 110. The cover 114 may be configured for movement with the housing 110 such that the cover 114 retracts and extends with the housing 110. The cover 114 may, in exemplary embodiments, form at least a portion of a landing for the staircase 100.

The cover 114 may comprise a rotating panel 116. The rotating panel 116 may be configured for movement with the cover 114 and/or the housing 110 such that the rotating panel 116 is extended and retracted with the same. The rotating panel 116 may be connected to the cover 114 in a hinged manner, such as for movement between a first position where said cover 114 and rotating panel 116 form a substantially flat surface, and a second position where said rotating panel 116 is rotated, such as by way of clockwise movement, to form an angle with said cover 114 as further shown and described with respect to at least FIG. 5.

As further shown and described herein, the housing 110 may be sized to accommodate components forming the steps of the staircase 100 while such components are in a folded position.

Figure 4:
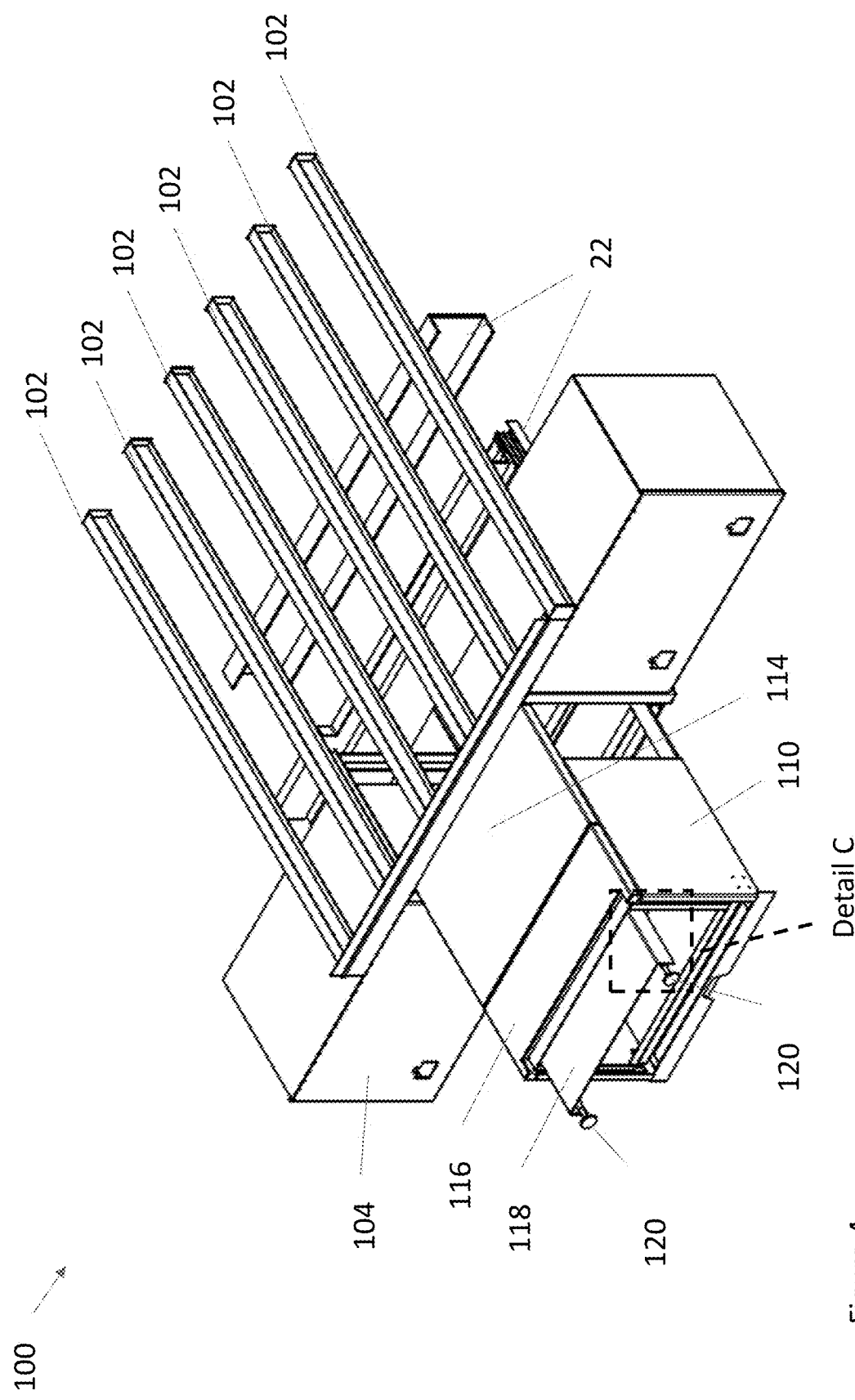
FIG. 4 is a detailed perspective view of the staircase of FIG. 2 in another partially deployed position.

As illustrated in FIG. 4, the panel 118 of the staircase 100 may be rotated, such as by way of clockwise movement. The panel 118 may be connected to a first portion of steps 122 of staircase 100 in a hinged manner configured to permit such rotational movement. The panel 118 may comprise one or more legs 120 which extend therefrom. The legs 120 may be adjustable in height such as by way of threads, telescoping mechanisms, some combination thereof, or the like. The legs 120 may be attached to the panel 118 in a hinged manner for rotation in exemplary embodiments. The panel 118 may be rotated after the staircase 100 is extended from the storage compartment 104. In exemplary embodiments, the panel 118 is configured for movement between a first position where the panel 118 is substantially flush with a first portion of steps 122 and a second position where the panel 118 is rotated clockwise, such as but not limited to, to extend substantially 90 degrees from the first portion of steps 112.

Figure 4B:
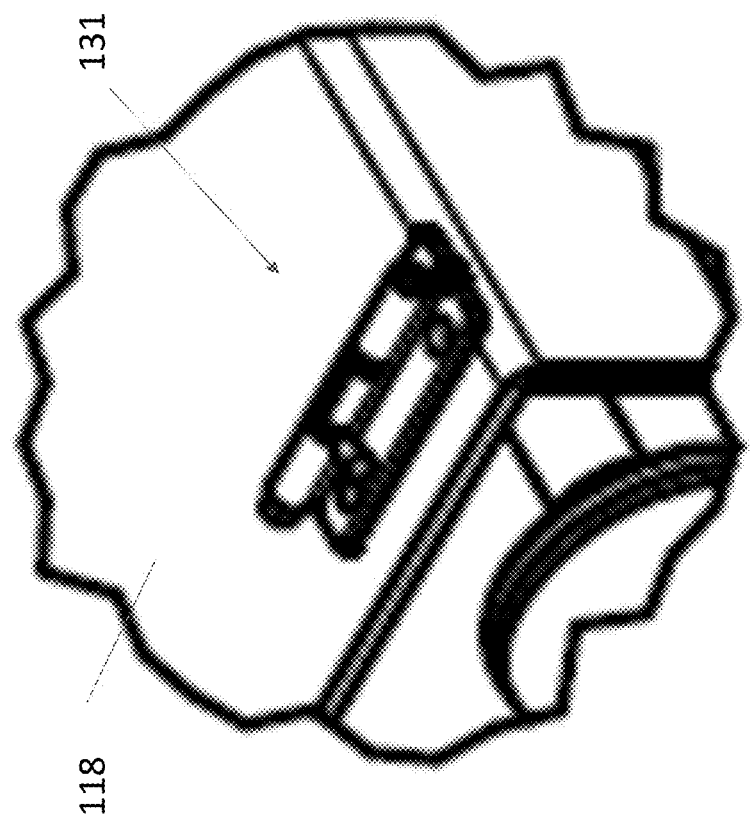
FIG. 4B is a detailed perspective view of detail C of FIG. 4 of an exemplary latching mechanism.

Latch pins 131, such as but not limited to those shown in FIG. 4B, may be utilized to temporarily secure the panel 118 into various positions. The latch pins 131 may comprise slide bolts, though any type or kind of latch pin 131 may be utilized. The latch pins 131, in exemplary embodiments, may be located along a lower edge of the panel 118 and may be configured for selective securement to the housing 110, such as to prevent rotation of the panel 118.

Figure 5:
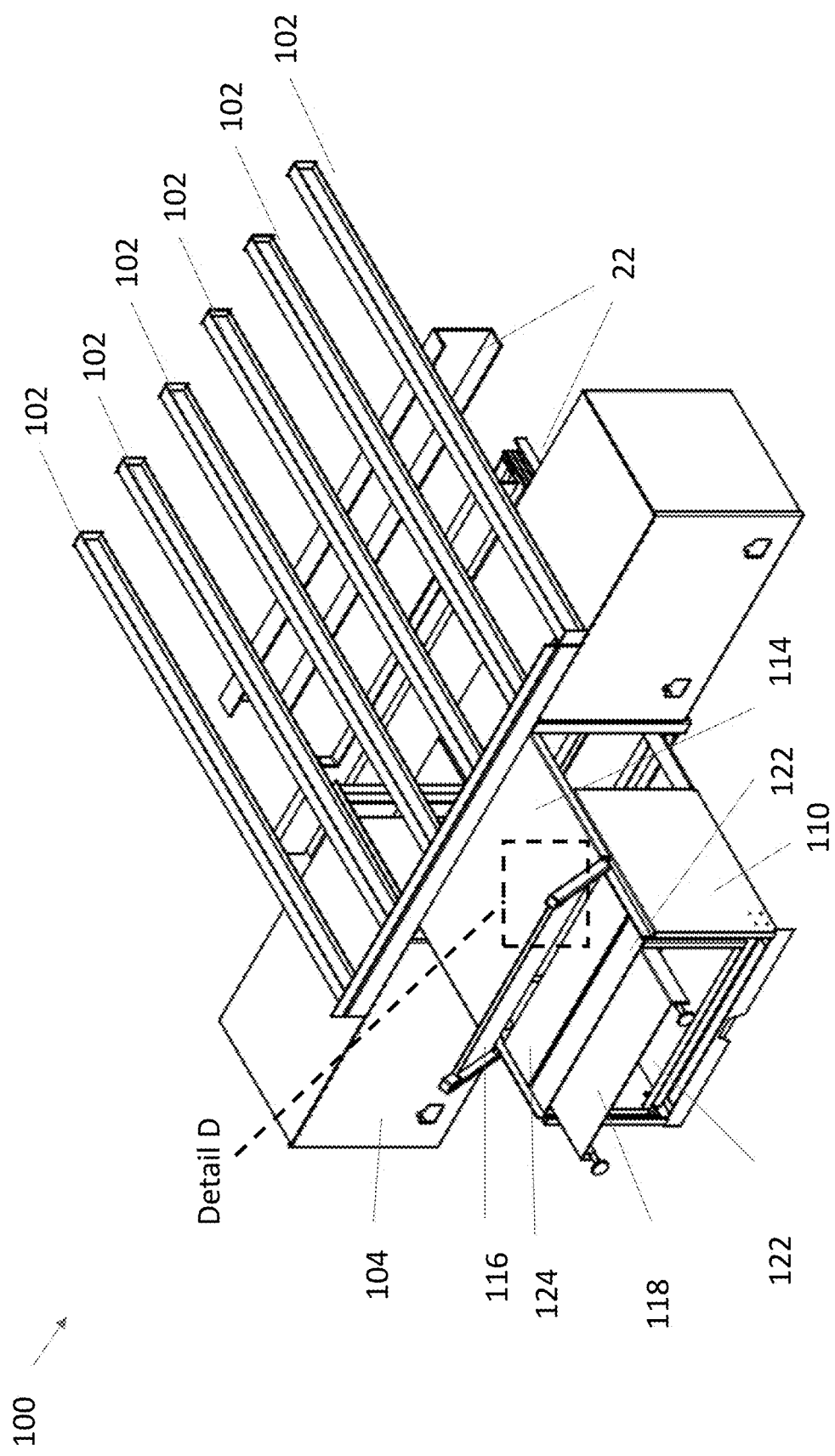
FIG. 5 is a detailed perspective view of the staircase of FIG. 2 in another partially deployed position.

As illustrated in FIG. 5, the rotating panel 116 may be rotated, such as by way of clockwise movement, permit access to, and movement of, additional components of the staircase 100. The rotating panel 116 may be attached to said cover 114 in a hinged manner. In exemplary embodiments, the rotating panel 116 may be rotatable from a first position where the rotating panel 116 forms a substantially flat surface with said cover 114, to a second position where said rotating panel 116 extends at an angle, such as but not limited to substantially 45 degrees, from the cover 114. However, the rotating panel 116 may be rotatable through any angle, such as but not limited to 90 and/or 180 degrees.

Figure 5B:
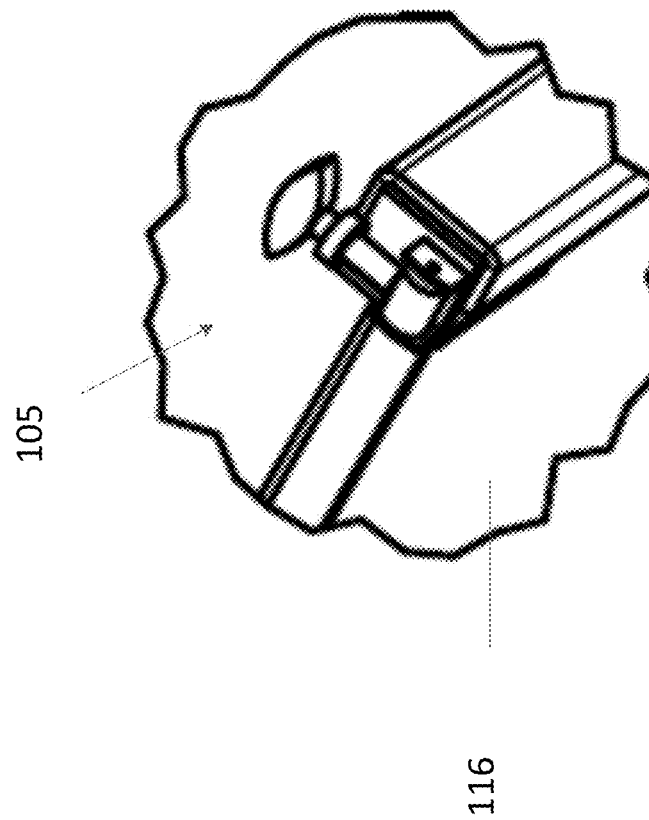
FIG. 5B is a detailed perspective view of detail D of FIG. 5 of an exemplary latching mechanism.

FIG. 5B illustrates the latching mechanism 105 which may be located along lower edges of the rotating panel 116 to selectively secure the rotating panel 116 to the housing 110 or other component of the staircase 100. Any number or type of latching mechanisms 105 may be utilized. The bracket 113 may be located at the housing 110 or other component of the staircase 100.

Movement of the rotational portion 116 into the second position may expose the first portion of steps 122 and a second portion of steps 124. In exemplary embodiments, the rotating panel 116 may be rotated only after said panel 118 is rotated, though such is not required.

Figure 6:
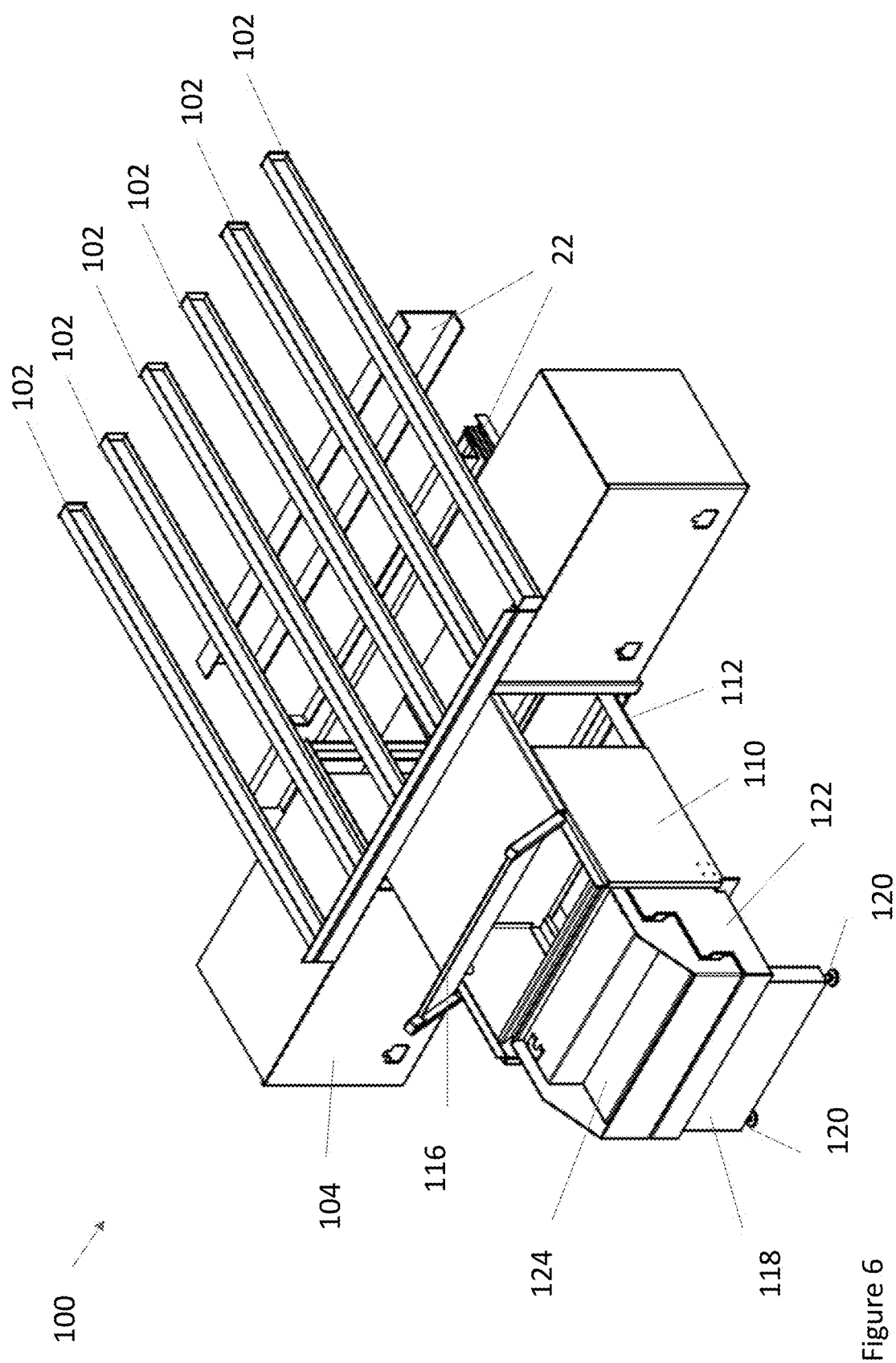
FIG. 6 is a detailed perspective view of the staircase of FIG. 2 in another partially deployed position.

As illustrated in FIG. 6, the first and second portions of steps 122 and 124 may be rotated. In exemplary embodiments, the first and second portions of steps 122 and 124 may be rotated between a stowage position where said first and second portions of steps 122 and 124 are stored in a folded position within said housing 110 and a deployed position where said first and second portions of steps 122 and 124 are located, partially or fully, outside of said housing 110 while still in the folded position, such as by way of counterclockwise movement. While in the folded position, the first portion of steps 122 may be mated with the second portion of steps 124. For example, without limitation, the step surfaces of the first and second portion of steps 122, 124 may contact and/or face one another in the folded position. Such rotation may be accomplished by a hinged connection between said first portion of steps 122 and said housing 110. Such rotation may be substantially 180 degrees, though any amount of rotation may be utilized. Such rotation may be made until the legs 120 of the panel 118 contact a ground surface.

Figure 7:
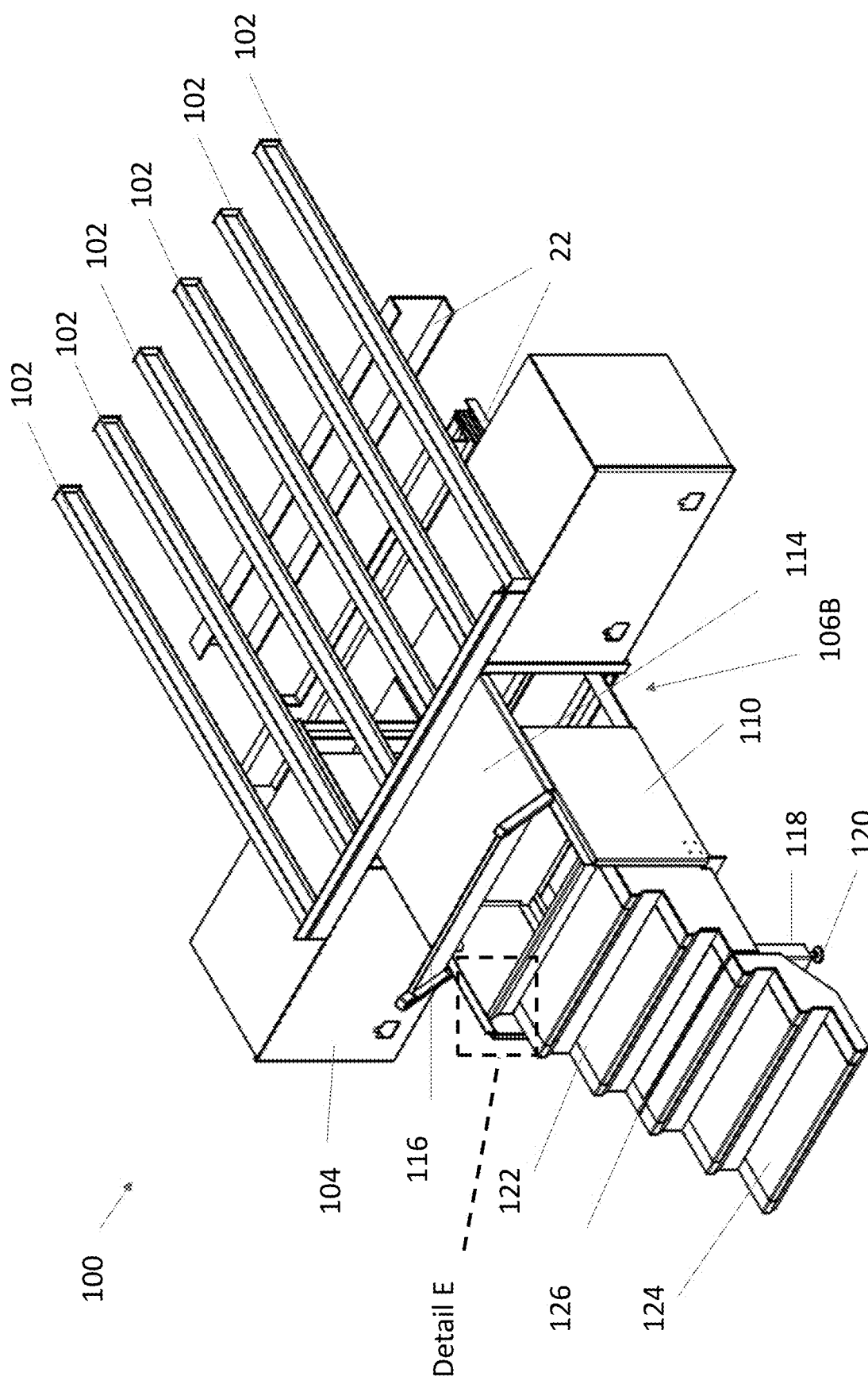
FIG. 7 is a detailed perspective view of the staircase of FIG. 2 in another partially deployed position.

As illustrated in FIG. 7, the second portion of steps 124 may be connected to the first portion of steps 122 in a hinged manner. This may permit movement of the second portion of steps 124 from the folded position into an unfolded position where the first and second portion of steps 122 and 124 form a continuous flight of stairs. Such rotation may be substantially 180 degrees by counterclockwise rotation, though any amount and/or direction of rotation may be utilized. In exemplary embodiments, a middle step 126 may be formed by both a portion of the second portion of steps 124 and a portion of the first portion of steps 112. The second portion of steps 124 may be configured to contact a ground surface when unfolded, though such is not required.

Figure 7B:
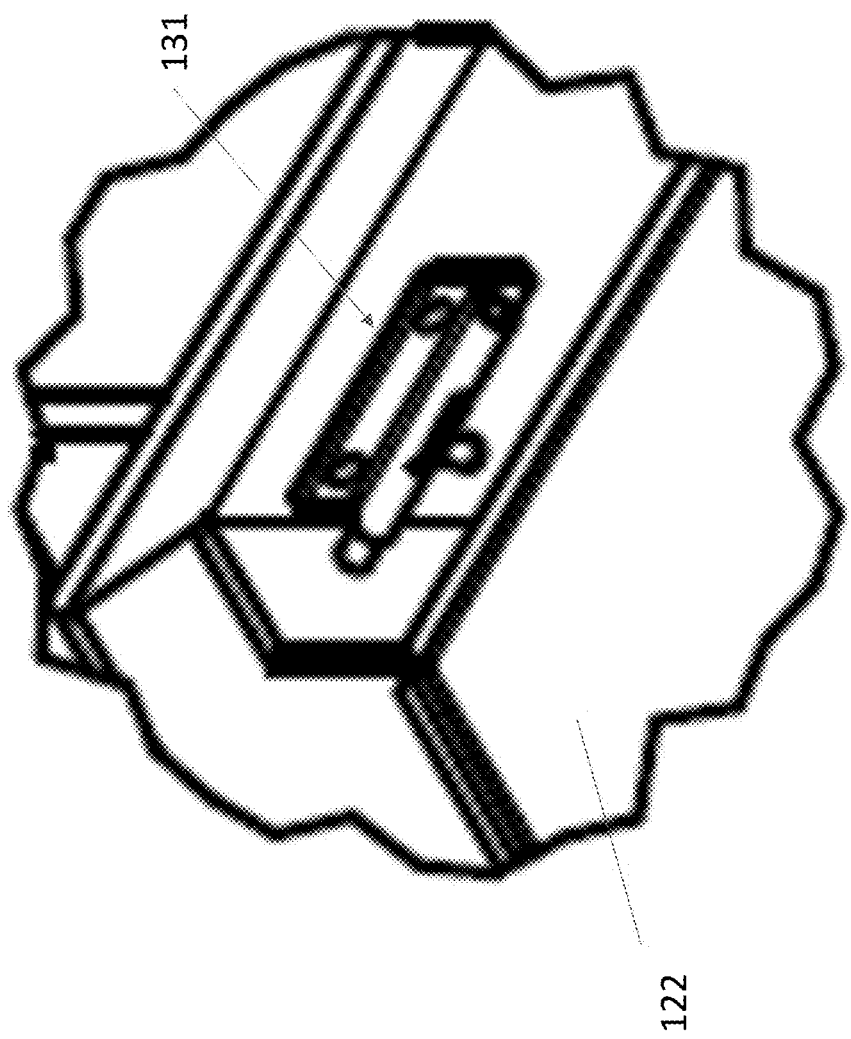
FIG. 7B is a detailed perspective view of detail E of FIG. 7 of an exemplary latching mechanism.

FIG. 7B illustrates latch pins 131 which may be located at distal portions of the first portion of steps 122 to selectively secure the second portion of steps 124 to first portion of steps 122, such as in the stowage position, or other components of the staircase 100.

Figure 8:
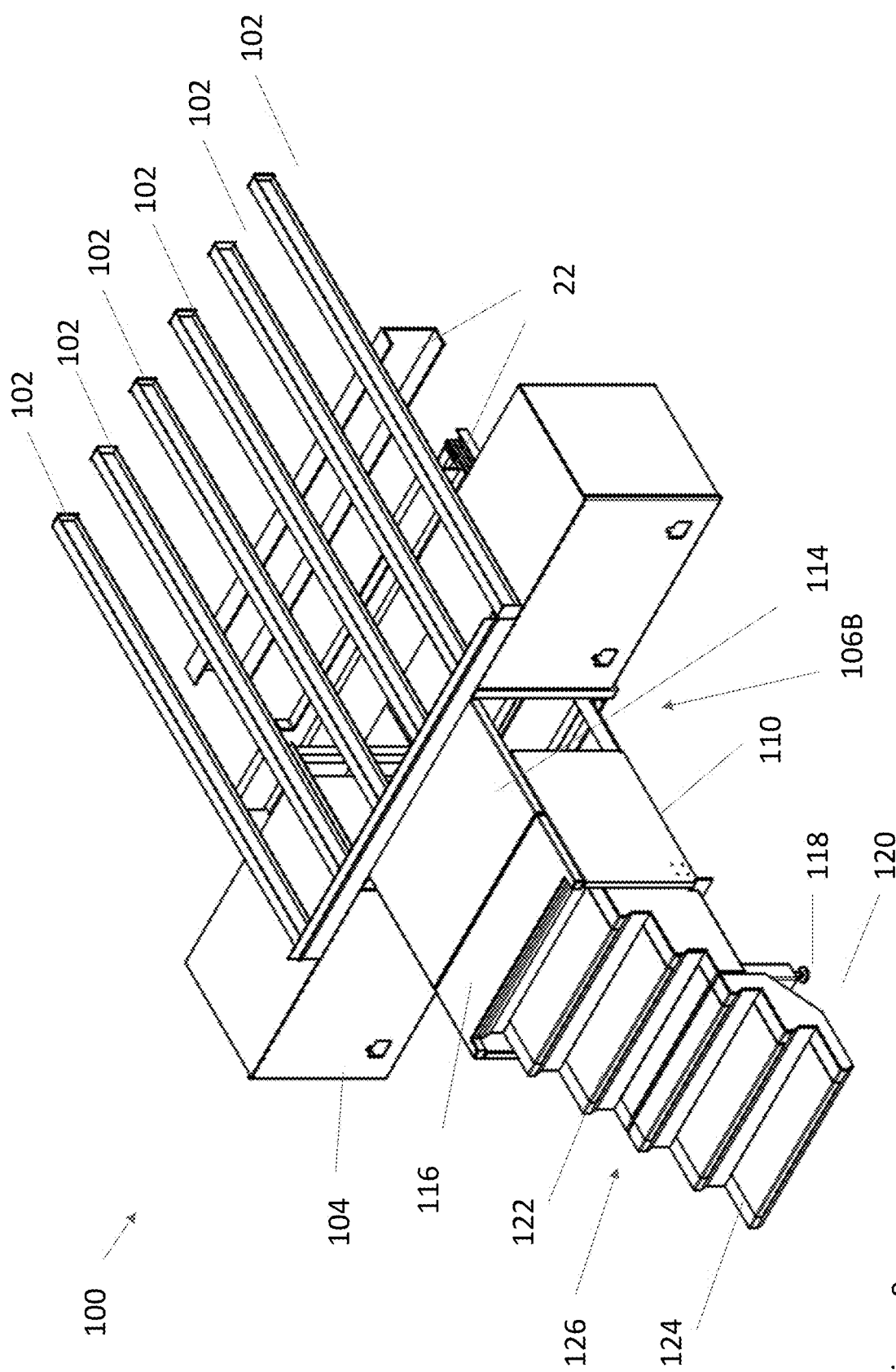
FIG. 8 is a detailed perspective view of the staircase of FIG. 2 in the deployed position.
Figure 9:
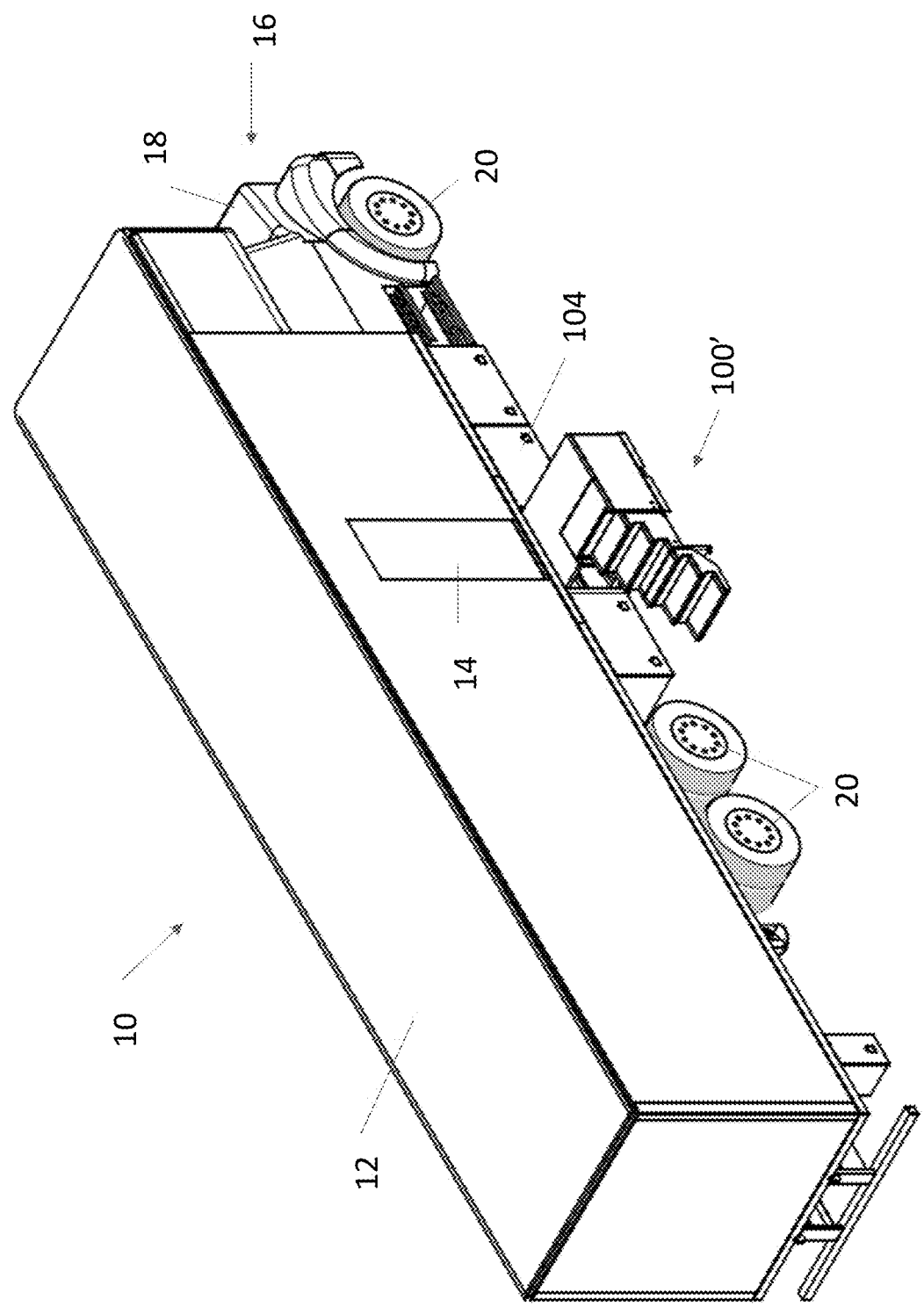
FIG. 9 is a rear perspective view of the vehicle with another exemplary embodiment of the staircase in a second orientation in accordance with the present invention.
Figure 10:
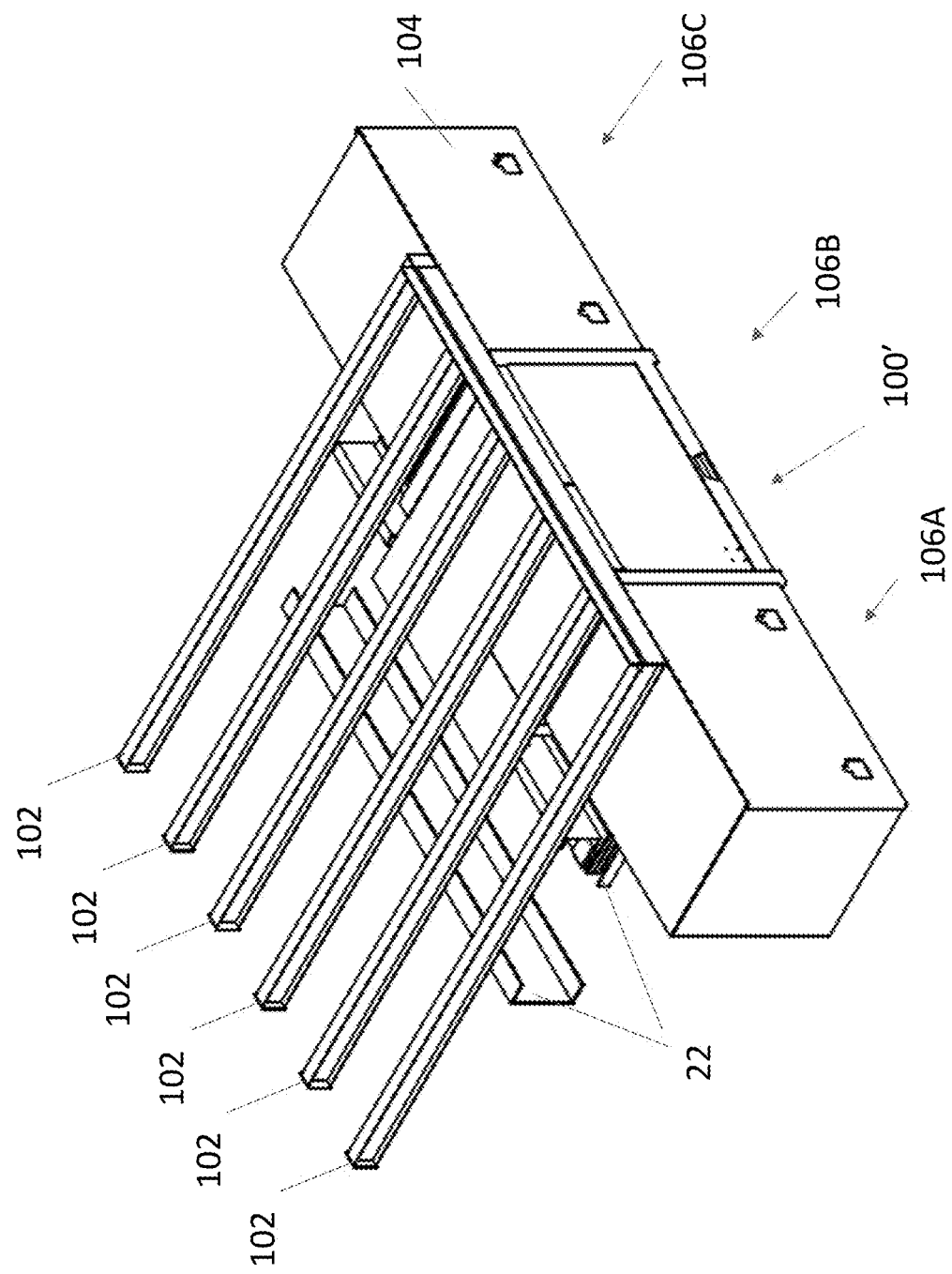
FIG. 10 is detailed perspective view of the staircase of FIG. 9 in a stowed position, the staircase being illustrated in isolation from at least certain components of the vehicle.
Figure 11:
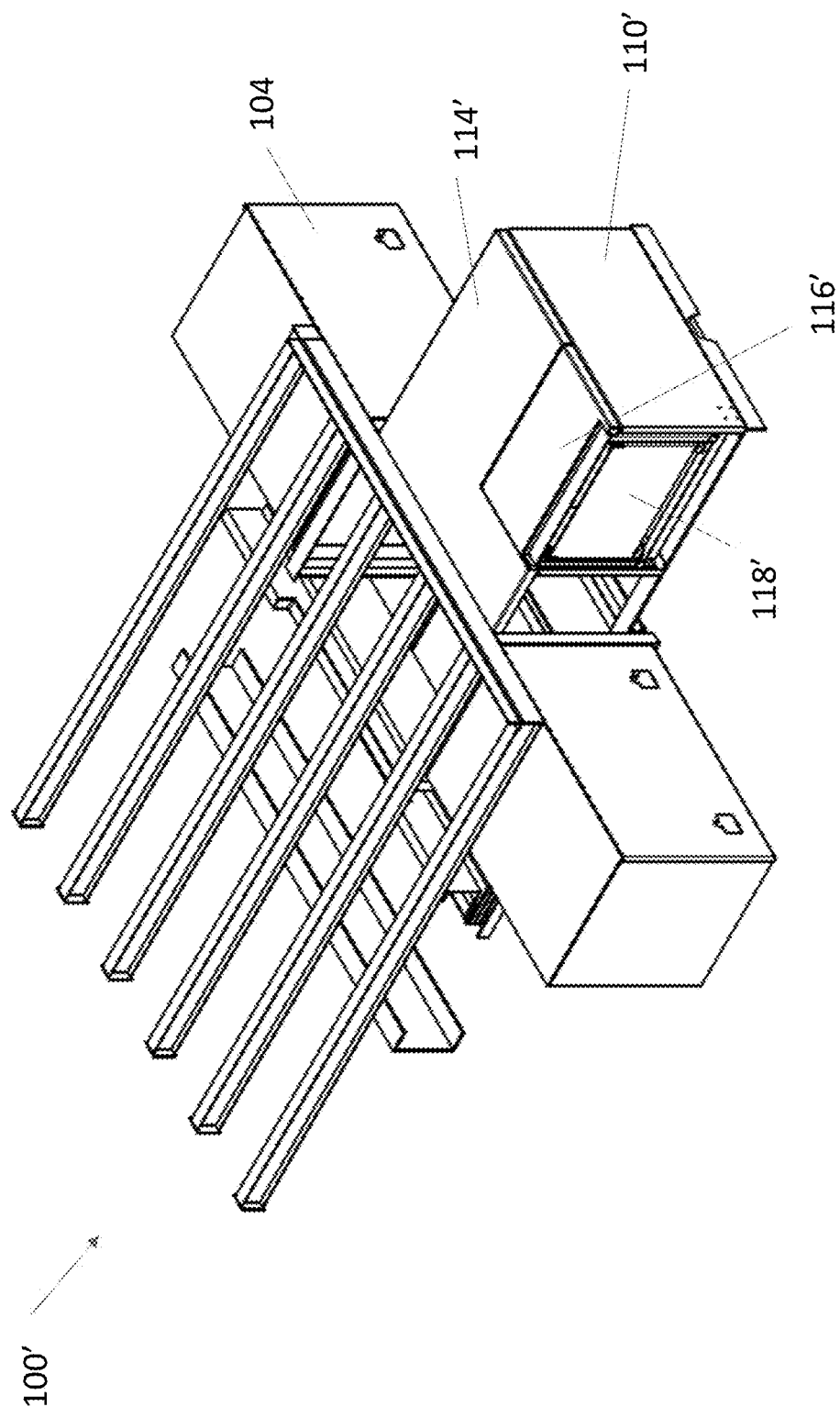
FIG. 11 is a detailed perspective view of the staircase of FIG. 10 in a partially deployed position.
Figure 12:
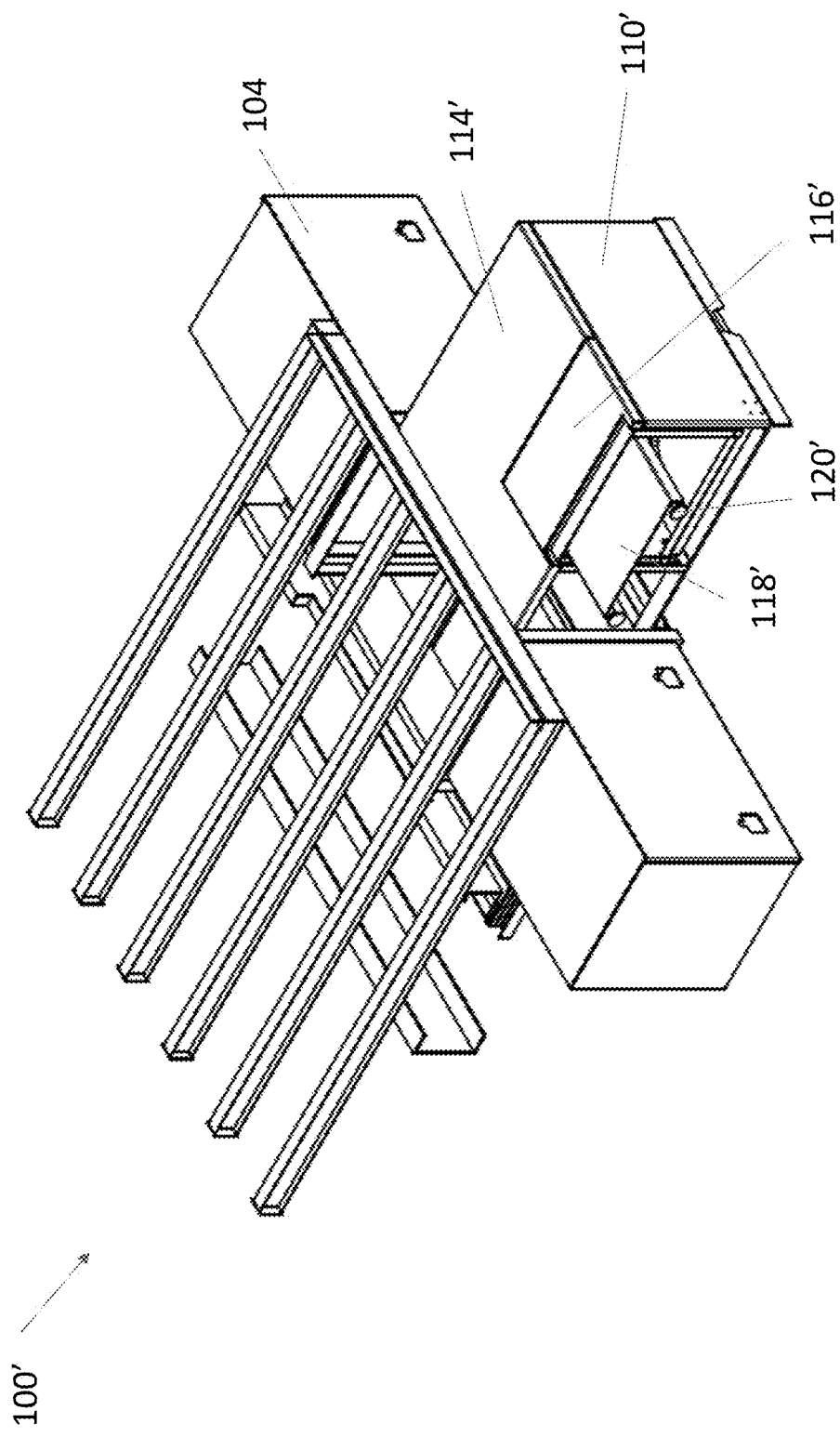
FIG. 12 is a detailed perspective view of the staircase of FIG. 10 in another partially deployed position.
Figure 13:
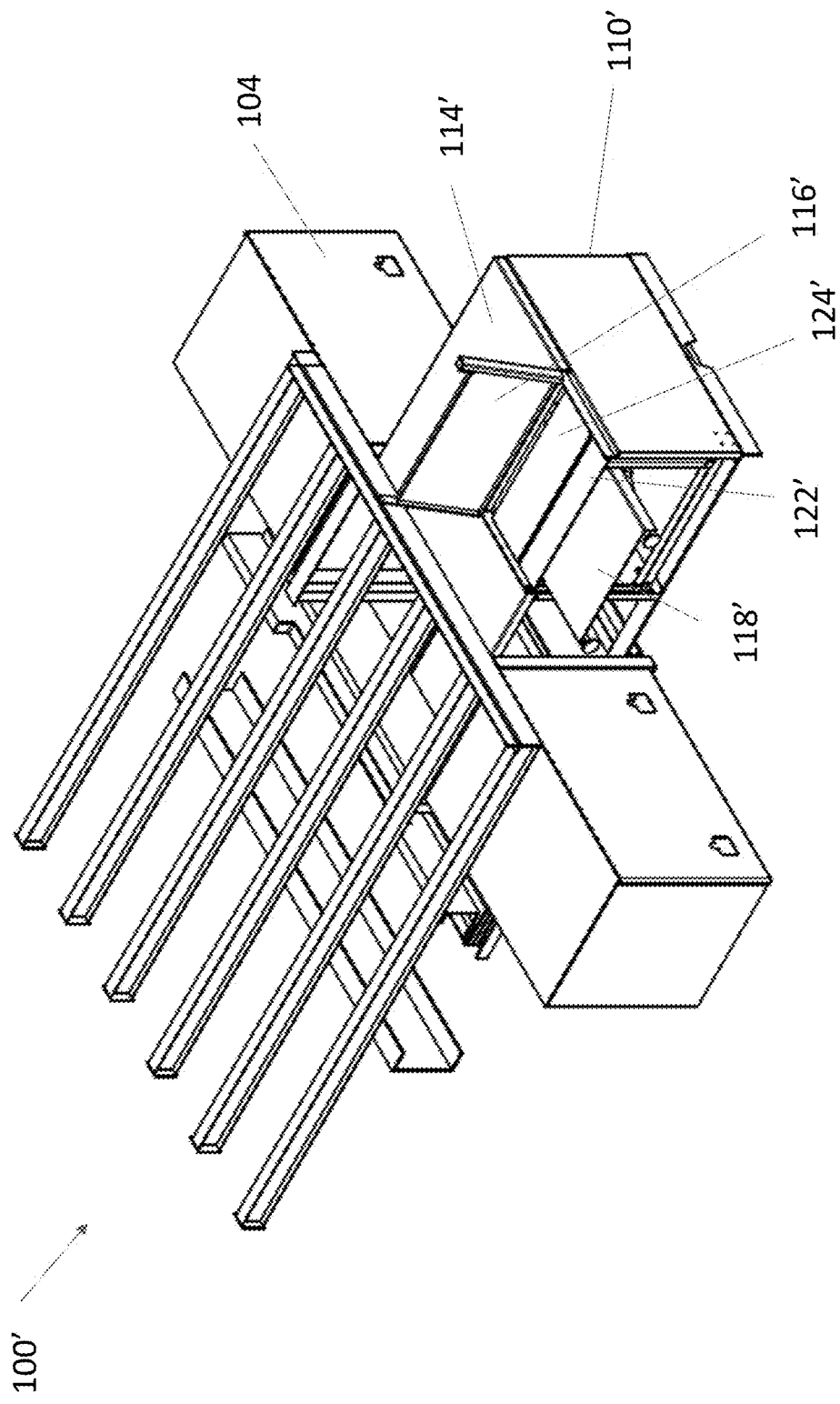
FIG. 13 is a detailed perspective view of the staircase of FIG. 10 in another partially deployed position.
Figure 14:
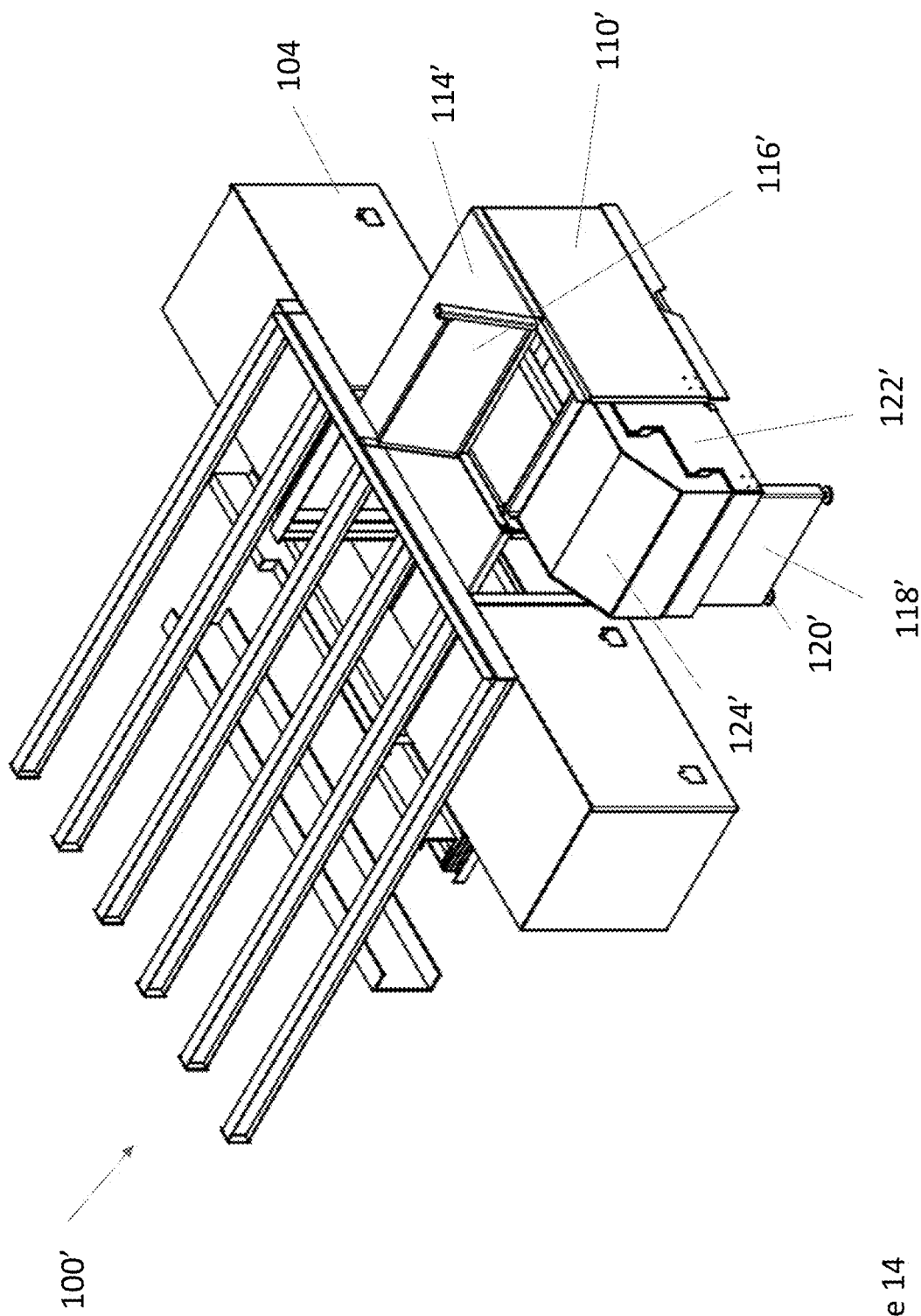
FIG. 14 is a detailed perspective view of the staircase of FIG. 10 in another partially deployed position.
Figure 15:
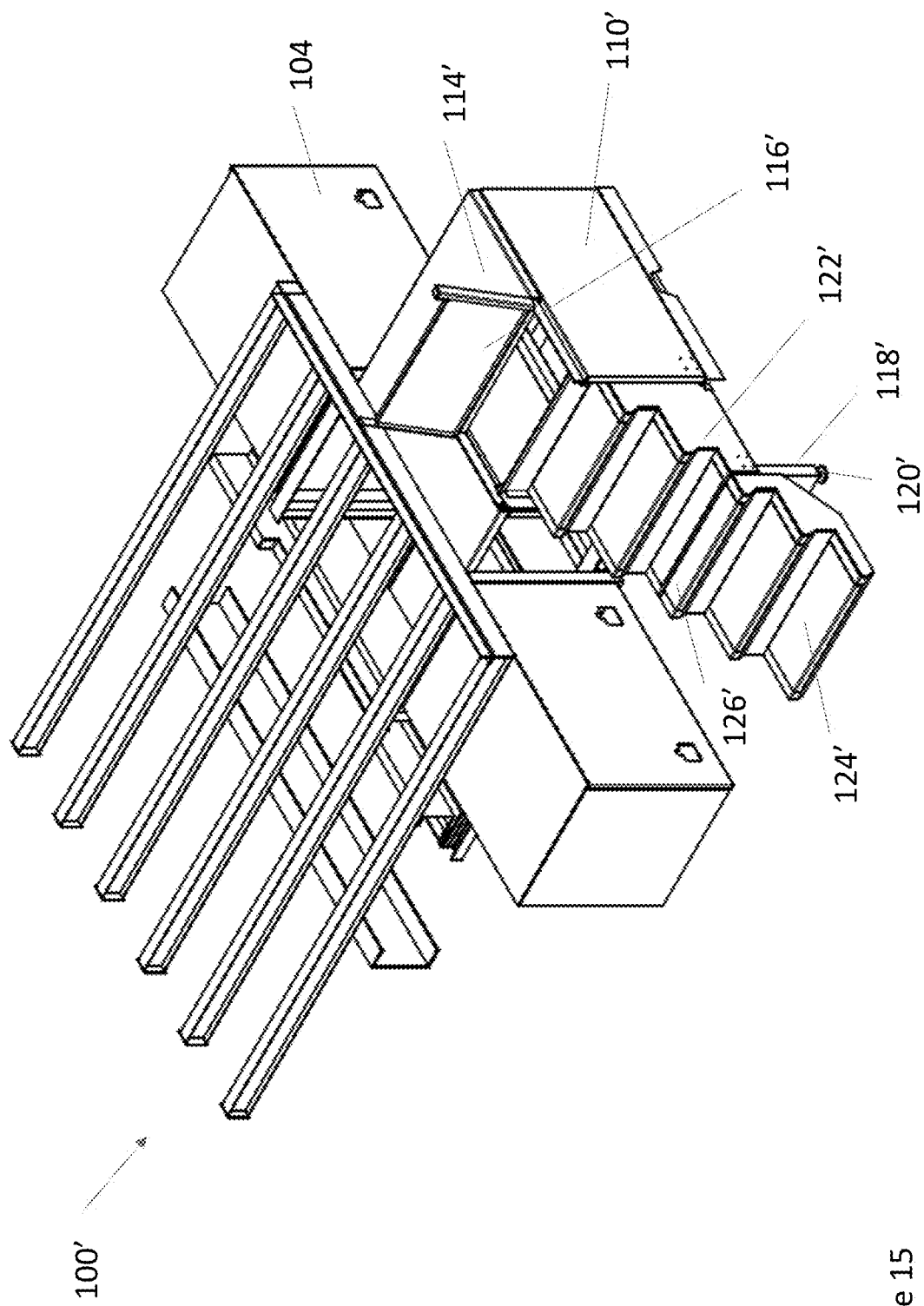
FIG. 15 is a detailed perspective view of the staircase of FIG. 10 in another partially deployed position.
Figure 16:
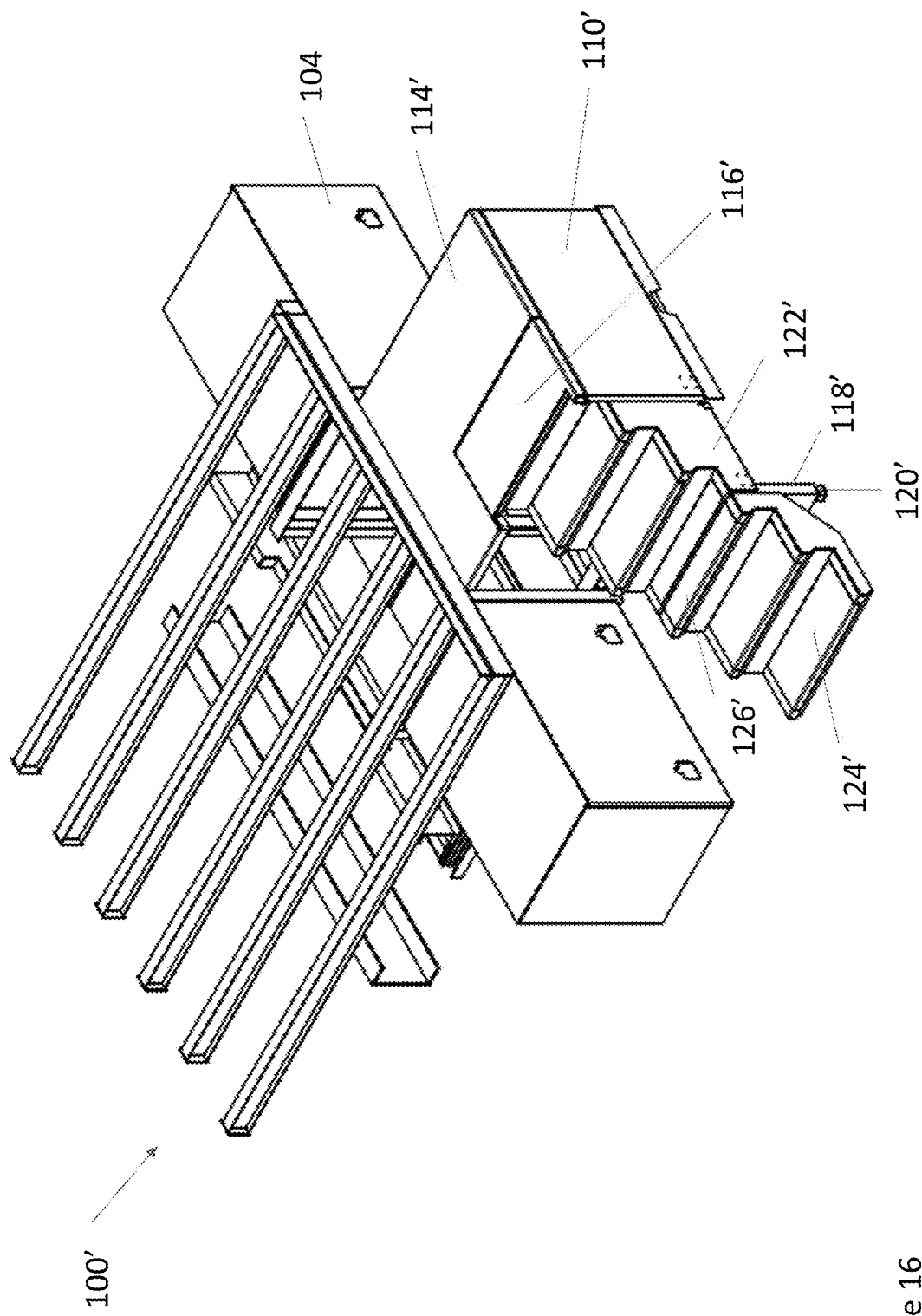
FIG. 16 is a detailed perspective view of the staircase of FIG. 10 in the deployed position.
Figure 17:
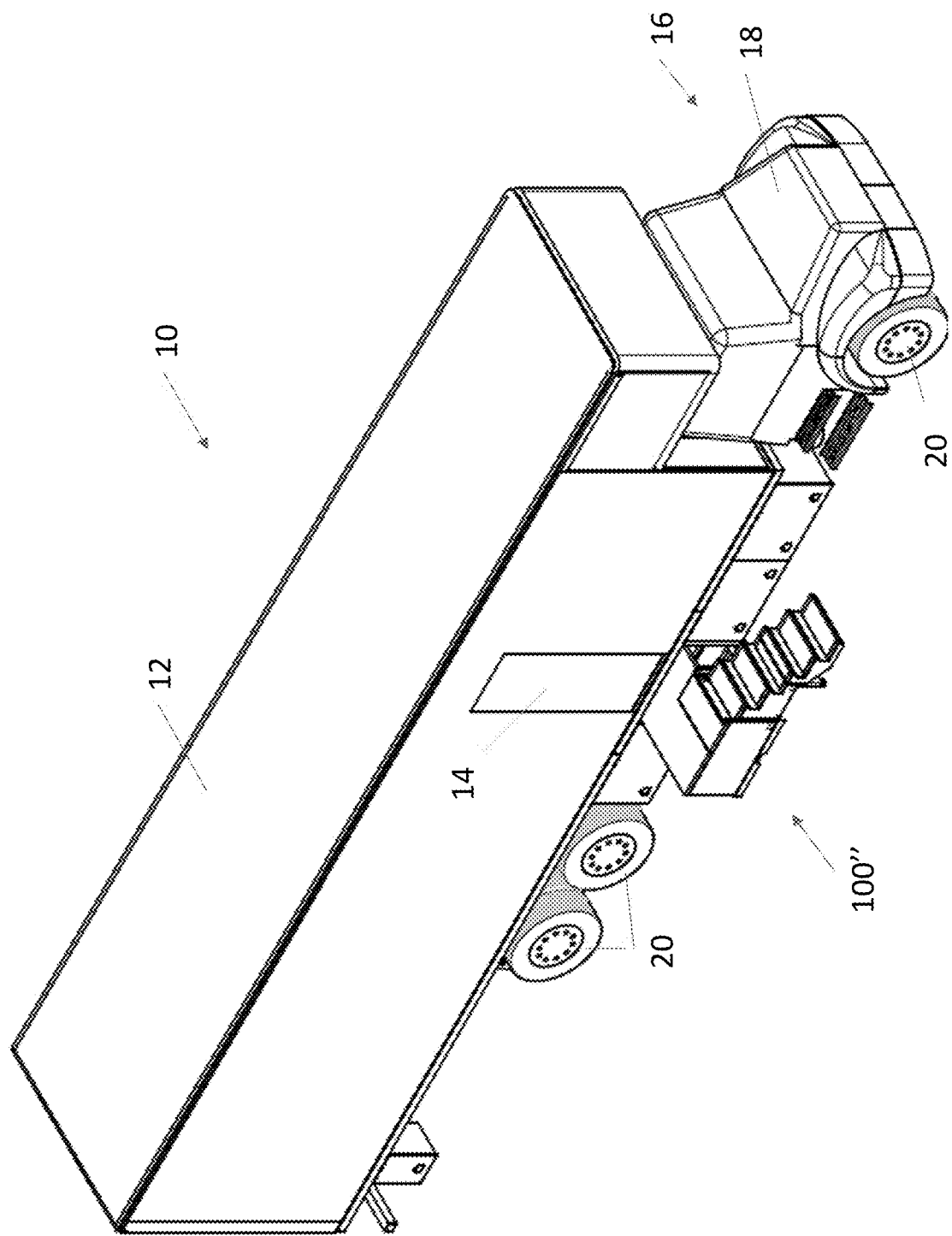
FIG. 17 is a rear perspective view of the vehicle with another exemplary embodiment of the staircase in a third orientation in accordance with the present invention.
Figure 18:
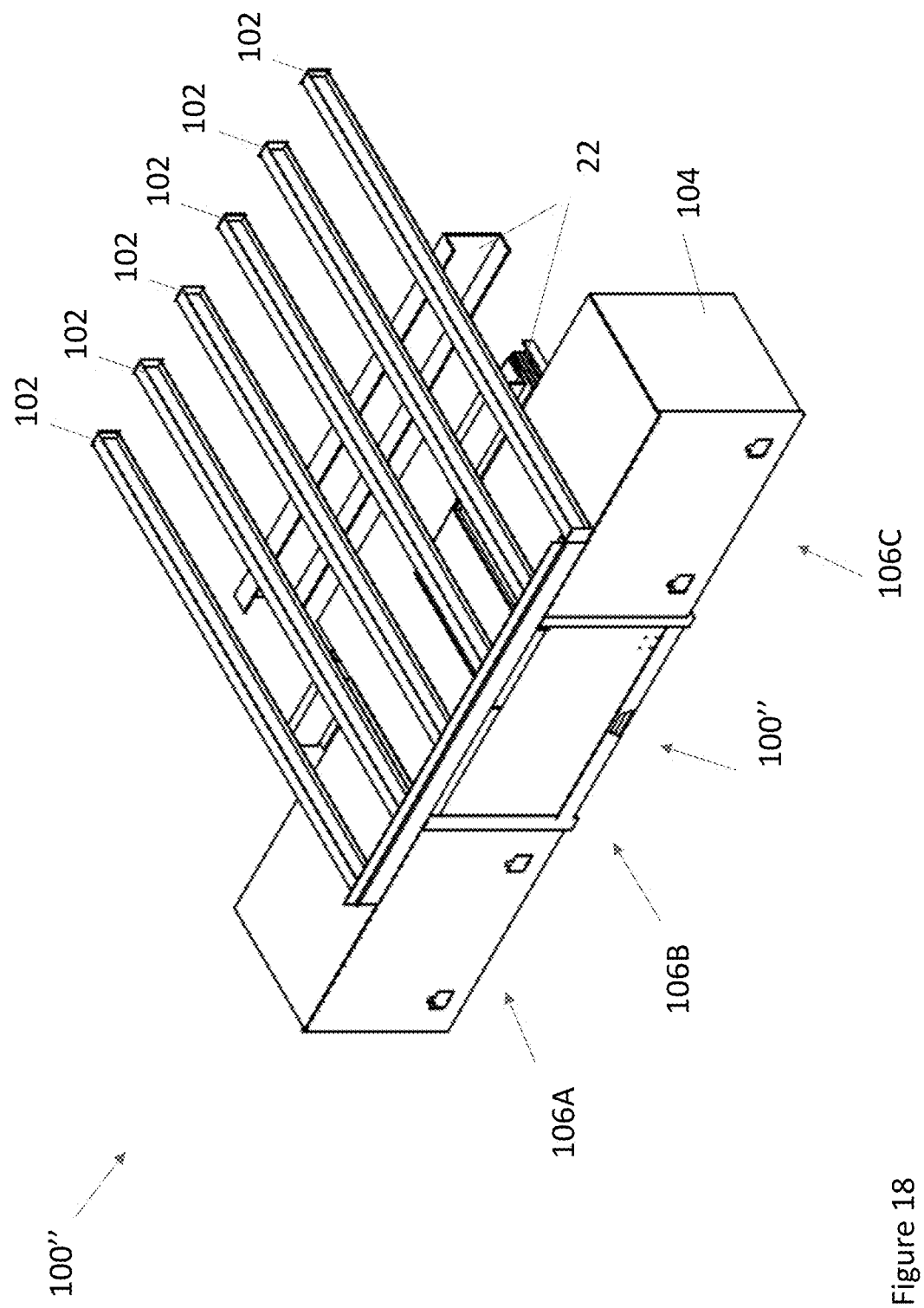
FIG. 18 is detailed perspective view of the staircase of FIG. 17 in a stowed position, the staircase being illustrated in isolation from at least certain components of the vehicle.
Figure 19:
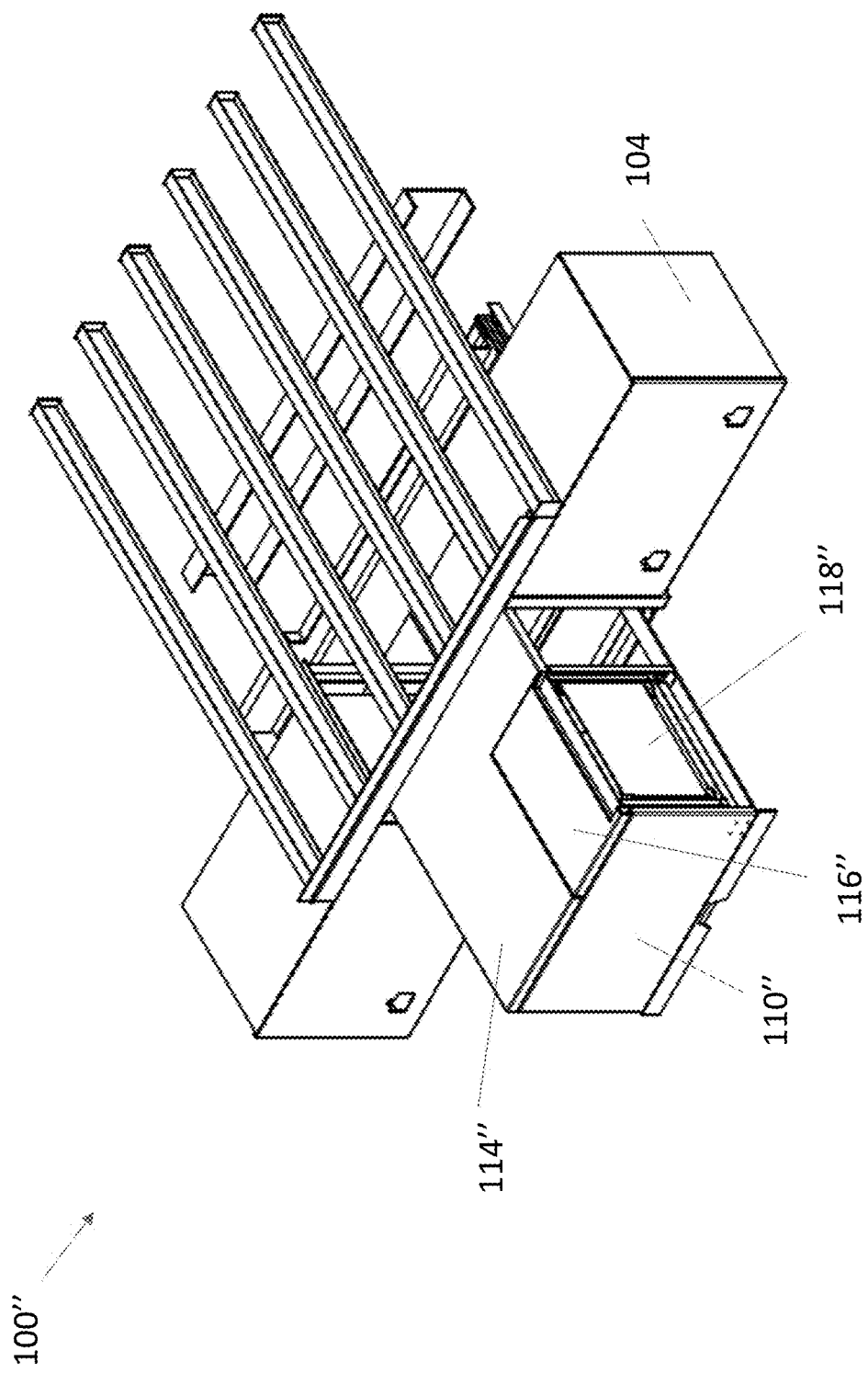
FIG. 19 is a detailed perspective view of the staircase of FIG. 18 in a partially deployed position.
Figure 20:
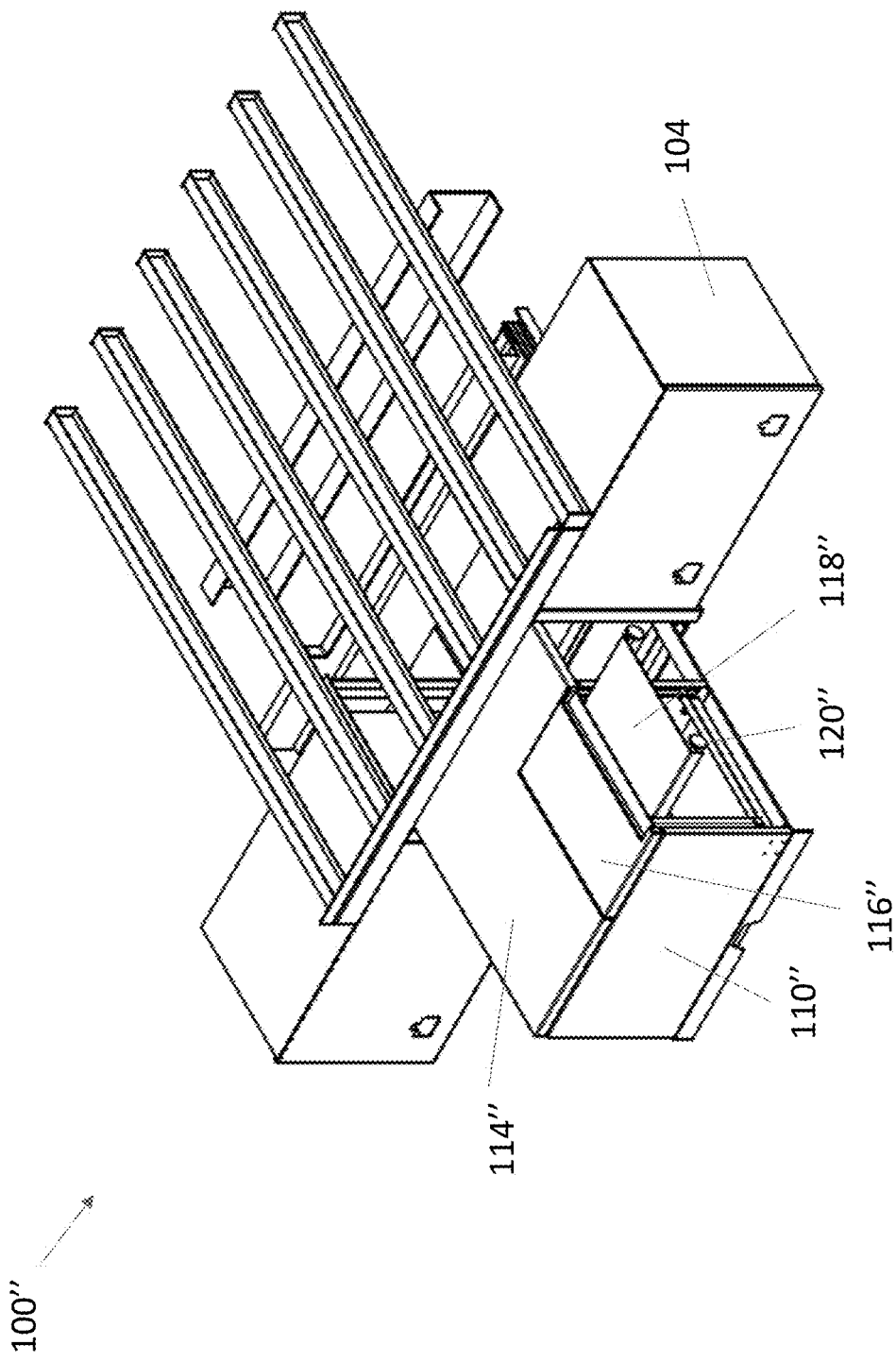
FIG. 20 is a detailed perspective view of the staircase of FIG. 18 in another partially deployed position.
Figure 21:
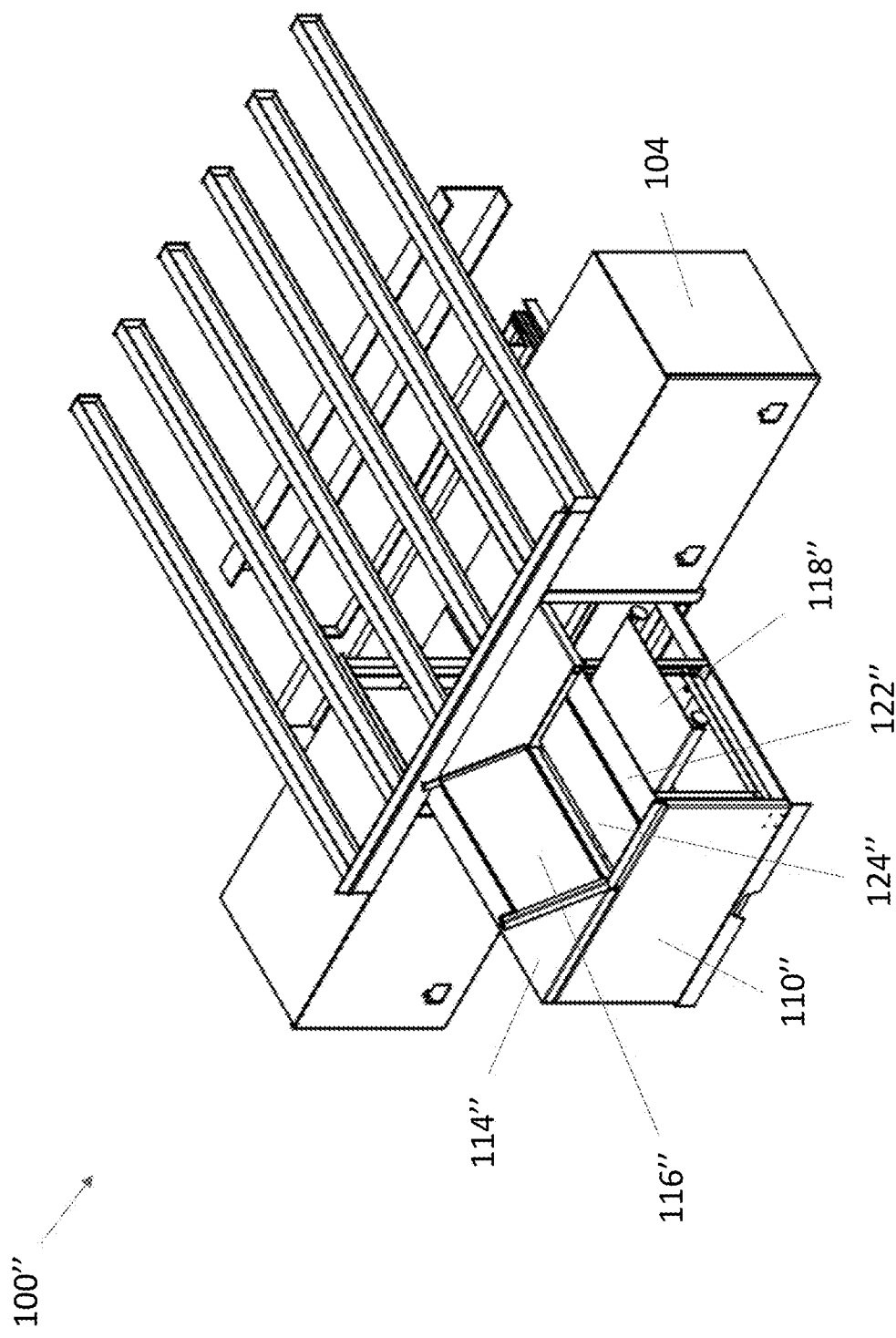
FIG. 21 is a detailed perspective view of the staircase of FIG. 18 in another partially deployed position.
Figure 22:
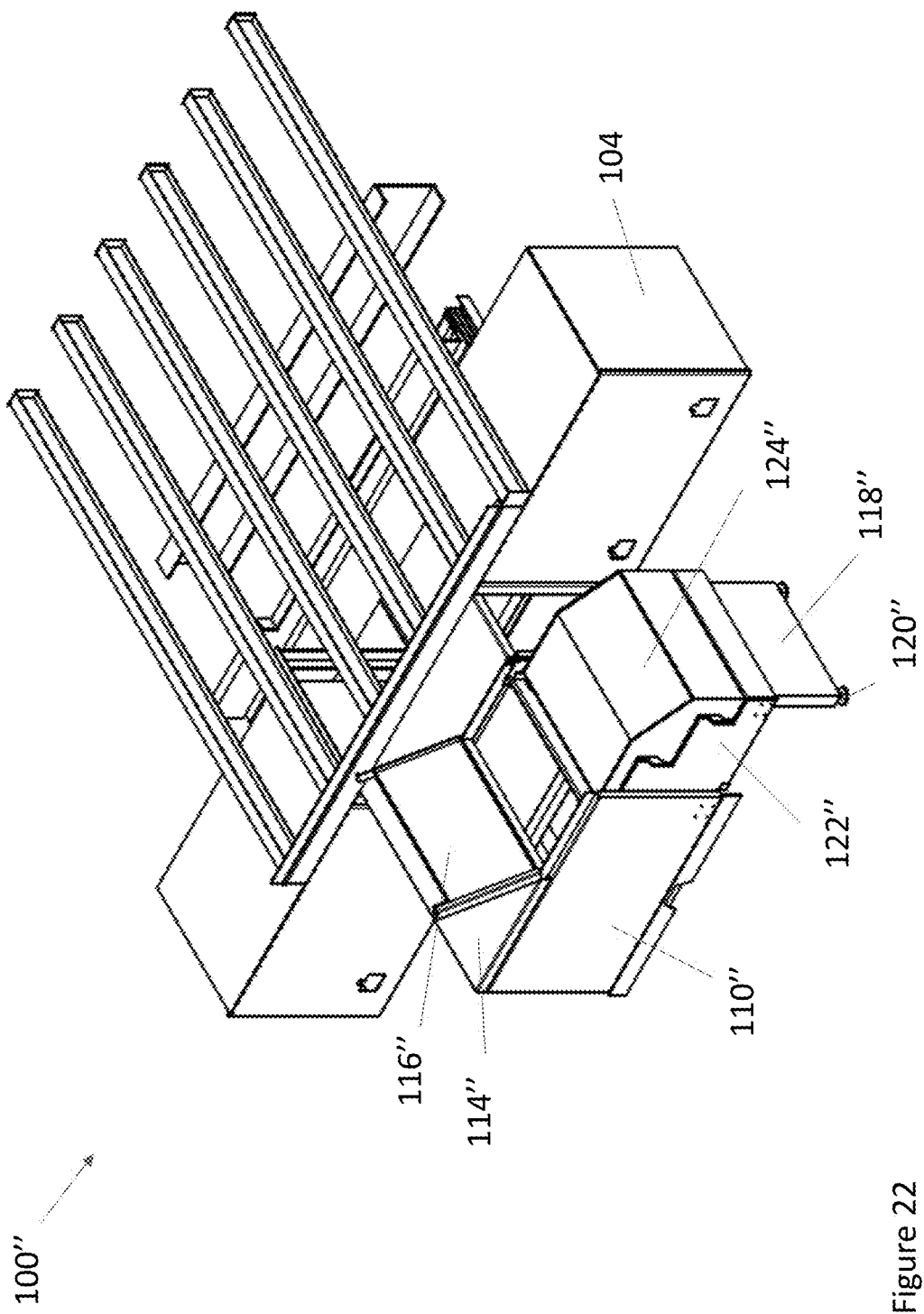
FIG. 22 is a detailed perspective view of the staircase of FIG. 18 in another partially deployed position.
Figure 23:
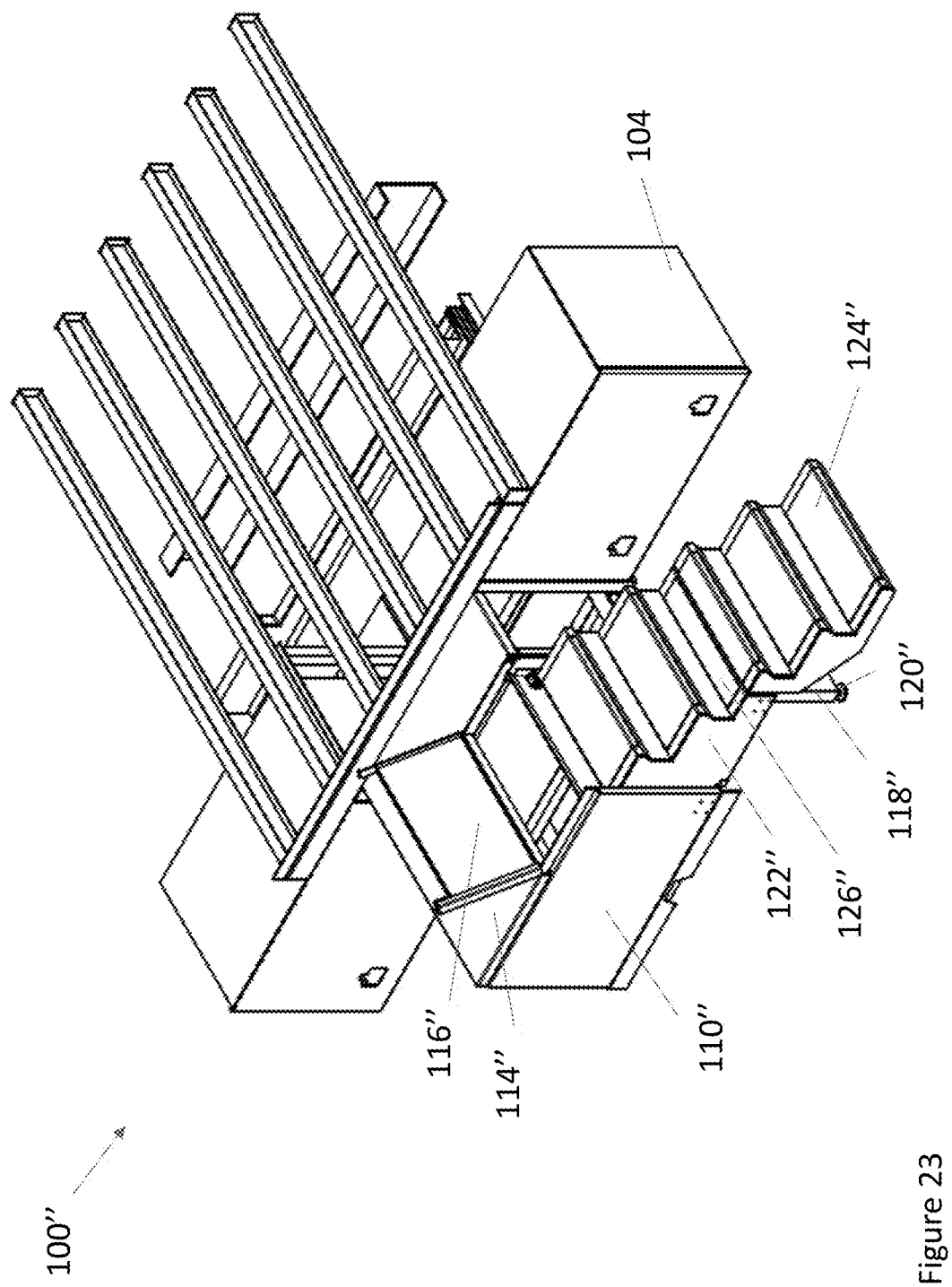
FIG. 23 is a detailed perspective view of the staircase of FIG. 18 in another partially deployed position.
Figure 24:
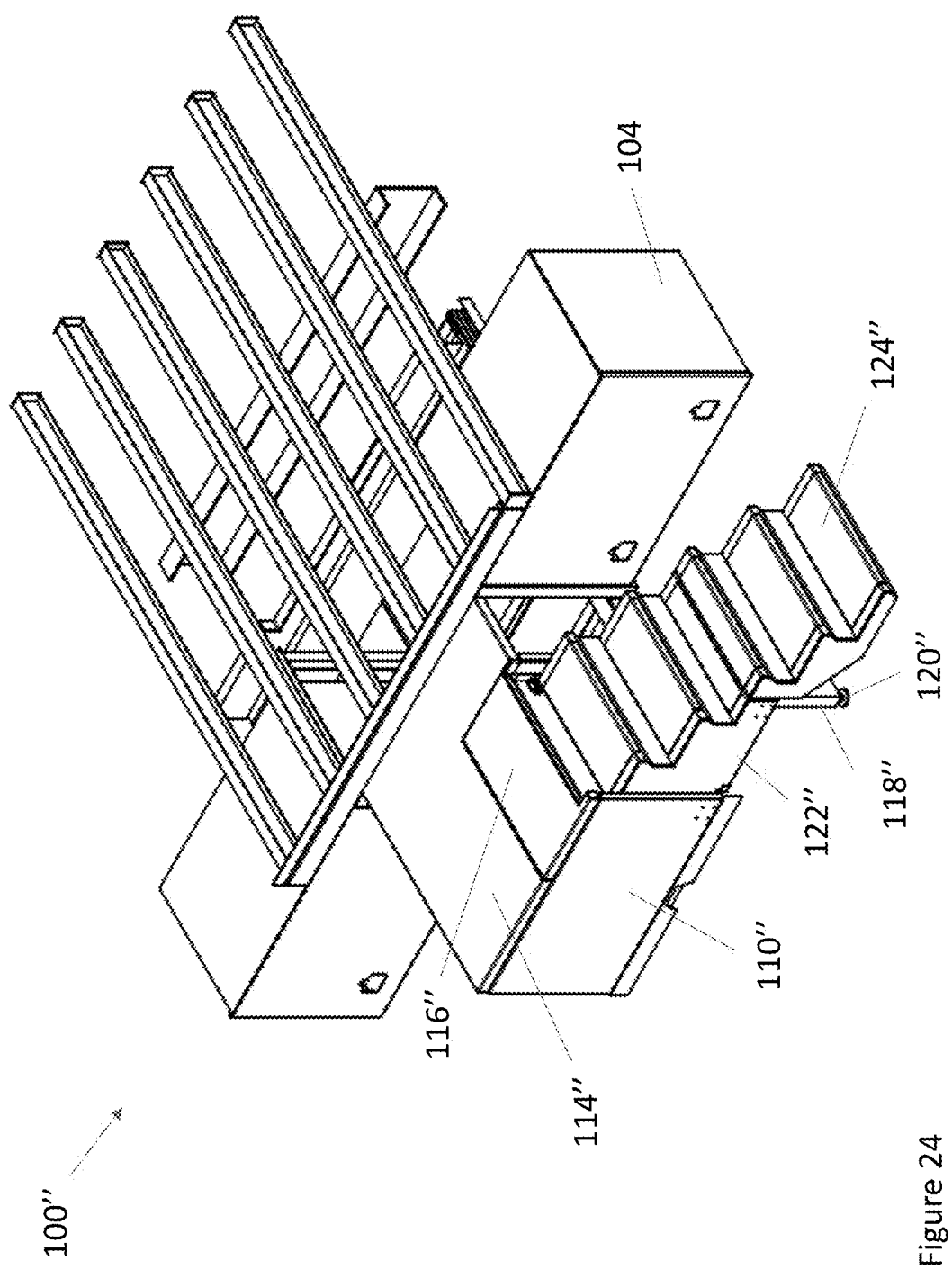
FIG. 24 is a detailed perspective view of the staircase of FIG. 18 in the deployed position.

As illustrated in FIG. 1 and FIG. 8, the rotating panel 116 may be returned to the first position, such as but not limited to by counterclockwise rotation, to form a top step and/or landing area in combination with the cover 114. To store the staircase 100, the same or similar process may be followed in reverse order. For example, without limitation, the second portion of the steps 124 may be rotated clockwise back into the folded position with the first portion of steps 122. The rotating panel 116 may be lifted and the first and second portion of steps 122, 124 may be rotated clockwise into the housing 110. The panel 118 may be rotated counterclockwise into the first position. The rotating panel 116 may be returned. The housing 110 may be retracted back into the storage compartment 104.

FIG. 9 through FIG. 16 illustrates another exemplary embodiment of the staircase 100' in a second orientation where said staircase 100', when deployed, extends forward along the vehicle 10. FIG. 17 through FIG. 24 illustrates yet another exemplary embodiment of the staircase 100" in a third orientation where said staircase 100", when deployed, extends reward along the vehicle 10. As illustrated in FIG. 9 through FIG. 24, certain components of the staircase 100/100'/100" may be oriented in the respective direction, such as a left orientation or a right orientation, to facilitate extension in such directions. In this way, the staircase 100/100'/100" may be configured for extension outward from the entrance 14 of the vehicle 10, forward along the vehicle 10, or rearward along the vehicle 10, for example without limitation. Any direction, or multiple directions, of the flight of stairs formed by the staircase 100/100'/100" may be utilized.

In exemplary embodiments, one or more of the housing 110/110'/110", the panel 118/118'/118", the first portion of steps 122/122'/122", the second portion of steps 124/1247124", the cover 114/1147114", and the rotating panel 116/116'/116" may be oriented to the left or right to facilitate extension in the respective direction. Such orientation may be provided by way of manufactured design. In other exemplary embodiments, certain components may be mounted one or more rotational mechanism which permit rotation of the same after manufacture. The size of the steps of the first and/or second portion of steps 112/112'/112", 124/124'/124" may be adjusted to fit within the housing 110/110'/110" while in such various orientations. The storage compartment 104 may be of the same or different size, shape, type, or the like to accommodate the variously oriented staircases 100/100'/100". The legs 120/120'/120" may be of the same or different size, shape, or type, for example without limitation, to accommodate various size vehicles 10.

The staircase 100/100'/100" may be configured for deployment by one person. The tread and/or riser dimensions of the steps of the staircase 100/100'/100" may confirm to widely-held standards in the construction industry. Some or all components of the staircase 100/100'/100" may comprise a polymer, metal, some combination thereof, or the like. In exemplary embodiments, some or all components of the staircase 100/100'/100" may comprise corrosion free or resistant materials. Dimensions of the staircase 100/100'/100" may confirm to platform size rules promulgated in one or more states for vehicle egress.

Various angles of rotation are shown and/or described here for purposes of example and are not intended to be limiting. Any angle may be utilized. Various directions of rotation are shown and/or described here for purposes of example and are not intended to be limiting. Any direction of rotation may be utilized.

In exemplary embodiments, the staircase 100/100'/100" may be operated manually. For example, without limitation, the staircase 100/100'/100" may be manually moved between the deployed, partially deployed, stowed, retracted, and advanced positions. In other exemplary embodiments, such movement may be accomplished by one or more motorized devices, computerized controllers, combination thereof, or the like.

Various devices may be used to temporarily secure various components of the staircase 100/100'/100" to one another. For example, without limitation, the latch pins 131 and/or latching mechanism 105 shown and described with respect to at least FIGS. 2B, 4B, 5B, and/or 7B may be utilized in any embodiment of the staircase 100/100'/100" shown and/or described herein, though any kind or type of mechanism may be utilized in any number of locations. The pull mechanism 121 shown and described with respect to at least FIG. 3B may be utilized with any embodiment of the staircase 100/100'/100" shown and/or described herein.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A compact, stowable staircase apparatus for a vehicle, said apparatus comprising:
    a housing;
    a first portion of steps attached to said housing in a hinged manner for rotational movement;
    a second portion of steps attached to said first portion of steps in a hinged manner for rotational movement between a folded position where said first portion of steps mates with said second portion of steps, and an unfolded position where said first and second portion of steps form a continuous flight of stairs;
    a movement device configured to permit movement of said housing between a retracted position where said housing is located within a storage area associated with said vehicle and an extended position where said housing is extended from said storage area, wherein said housing is configured to accommodate said first and second portion of steps when said first and second portion of steps are in said folded position; and
    a panel attached to said first portion of steps in a hinged manner for rotational movement between a first position where said panel is flush with said first portion of steps, and a second position where said panel extends from said first portion of steps.

2. The apparatus of claim 1 wherein:
    said housing defines a cuboid shaped space.

3. The apparatus of claim 1 wherein:
    said movement device comprises one or more rails configured to permit sliding movement of said housing between said retracted position and said extended position.

4. The apparatus of claim 1 further comprising:
    a first and second adjustable leg located at said panel.

5. The apparatus of claim 1 further comprising:
a cover forming at least a portion of said housing; and
a rotating panel attached to said cover in a hinged manner for rotational movement between a first position where said rotating panel and said cover form a flat surface, and a second position where said rotating panel forms an angle with said cover, wherein said cover and said rotating panel form a landing for said staircase when said rotating panel is in said first position.

6. The apparatus of claim 5 wherein:
placement of said rotating panel in said second position facilitates rotational movement of said first and second portion of steps between a first position where said first and second set of steps are in said folded position and located within said housing and a second position where said first and second set of steps are in said folded position and located outside said housing.

7. The apparatus of claim 2 wherein:
said housing is configured to be stored within a storage compartment attached below said vehicle.

8. The apparatus of claim 7 wherein:
said vehicle comprises a mobile medical unit; and
said storage compartment is located adjacent to an entrance to a medical compartment of said mobile medical unit.

9. The apparatus of claim 8 wherein:
said vehicle comprises a truck; and
said storage compartment is attached to a frame of said truck.

10. The apparatus of claim 8 wherein:
said first and second portion of steps are configured to extend outward from the entrance when in said unfolded position.

11. The apparatus of claim 8 wherein:
said first and second portion of steps are configured to extend forward or rearward along said vehicle when in said unfolded position.

12. A method for facilitating ingress into, and egress from, a vehicle, said method comprising the steps of:
extending a housing from a storage compartment located adjacent to an entrance for a medical compartment of the vehicle;
lifting a panel attached to a first portion of steps;
lifting a rotating panel relative to a cover to expose a first portion of steps and a second portion of steps stored in a folded position within said housing;
rotating said first and second portion of steps from said housing while said first and second portion of steps are in said folded position; and
unfolding said second portion of steps from said first portion of steps to form a continuous flight of stairs.

13. The method of claim 12 wherein:
legs of said panel contact a ground surface when said first and second portion of steps are rotated from said housing.

14. The method of claim 12 further comprising the steps of:
lowering said rotating panel to form a landing for said staircase.

15. The method of claim 12 further comprising the steps of:
folding said second portion of steps onto said first portion of steps;
lifting the rotating panel relative to the cover to expose a space for said first portion of steps and said second portion of steps;
rotating said first and second portion of steps into said housing while said first and second portion of steps are in said folded position;
retracting said housing into said storage compartment.

16. The method of claim 15 wherein:
said panel is lifted by way of clockwise rotational movement;
said rotational panel is lifted by way of clockwise rotational movement;
said first and second portion of steps are rotated counterclockwise; and
said first and second portion of steps are unfolded by counterclockwise movement.

17. A system for facilitating access to a vehicle, said system comprising:
a storage compartment mounted to a frame of said vehicle, said storage compartment comprising a number of individual storage areas;
a housing configured to fit within a particular one of said number of individual storage areas, said housing comprising:
a first side panel;
a second side panel;
a cover; and
a rotating panel attached to said cover in a hinged manner to permit movement between a first position where said rotating panel and said cover form a flat landing surface and a second position where said rotating panel extends at an angle from said cover;
a first portion of steps attached to said housing in a hinged manner;
a panel attached to said first portion of steps in a hinged manner;
a first and second leg attached to said panel, wherein each of said first and second legs are height adjustable;
a second portion of steps attached to said first portion of steps in a hinged manner for rotational movement between a folded position where steps in said first portion of steps faces an opposing steps in said second portion of steps, and an unfolded position where said first and second portion of steps form a continuous flight of stairs; and
a first and second slide configured to facilitate sliding movement of said housing between a retracted position where said housing is located within said particular one of said number of individual storage areas and an extended position where said housing is located outside said particular one of said number of individual storage areas;
wherein movement of said rotating panel into said second positions is configured to permit rotational movement of said first and second portion of steps into and out of said housing while said first and second portion of steps are in said folded position;
wherein said first and second portion of steps are configured to fit within said housing when in said folded position.

18. The system of claim 17 wherein:
said vehicle comprises:
a cab;
a frame supporting said storage compartment;
a number of wheels mounted to said frame; and
a medical compartment comprising at least one entrance; and
said first and second set of steps are configured to extend outwardly from said at least one entrance to said medical compartment.

19. A compact, stowable staircase apparatus for a vehicle, said apparatus comprising:
- a housing;
- a first portion of steps attached to said housing in a hinged manner for rotational movement;
- a second portion of steps attached to said first portion of steps in a hinged manner for rotational movement between a folded position where said first portion of steps mates with said second portion of steps, and an unfolded position where said first and second portion of steps form a continuous flight of stairs; and
- a movement device configured to permit movement of said housing between a retracted position where said housing is located within a storage area associated with said vehicle and an extended position where said housing is extended from said storage area, wherein said housing is configured to accommodate said first and second portion of steps when said first and second portion of steps are in said folded position;
- a cover forming at least a portion of said housing;
- a rotating panel attached to said cover in a hinged manner for rotational movement between a first position where said rotating panel and said cover form a flat surface, and a second position where said rotating panel forms an angle with said cover, wherein said cover and said rotating panel form a landing for said staircase when said rotating panel is in said first position.

20. The apparatus of claim 19 wherein:

placement of said rotating panel in said second position facilitates rotational movement of said first and second portion of steps between a first position where said first and second set of steps are in said folded position and located within said housing and a second position where said first and second set of steps are in said folded position and located outside said housing.

* * * * *

UNITED STATES PATENT AND TRADEMARK OFFICE
CERTIFICATE OF CORRECTION

PATENT NO. : 11,511,671 B2
APPLICATION NO. : 17/061635
DATED : November 29, 2022
INVENTOR(S) : Kenneth L. Guse et al.

Page 1 of 1

It is certified that error appears in the above-identified patent and that said Letters Patent is hereby corrected as shown below:

In the Specification

Column 7, Line 16, please delete "1247124", the cover 114/1147114"," and insert -- 124'/124", the cover 114/114'/114", --.

Signed and Sealed this
Twenty-fourth Day of January, 2023

Katherine Kelly Vidal
*Director of the United States Patent and Trademark Office*